US007880806B2

(12) United States Patent
Maeda

(10) Patent No.: US 7,880,806 B2
(45) Date of Patent: Feb. 1, 2011

(54) IMAGING OPERATION CONTROLLER

(75) Inventor: Kazuyoshi Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1317 days.

(21) Appl. No.: 11/400,934

(22) Filed: Apr. 10, 2006

(65) Prior Publication Data

US 2006/0256230 A1 Nov. 16, 2006

(30) Foreign Application Priority Data

Apr. 14, 2005 (JP) ............................ P2005-116597

(51) Int. Cl.
- H04N 5/225 (2006.01)
- H04N 5/44 (2006.01)
- G03B 17/00 (2006.01)
- G03B 17/02 (2006.01)

(52) U.S. Cl. ..................... 348/373; 348/375; 348/376; 348/734; 396/48; 396/535

(58) Field of Classification Search ......... 348/373–376; 396/419–428

See application file for complete search history.

(56) References Cited

U.S. PATENT DOCUMENTS

| 4,729,067 | A * | 3/1988 | Ohe ............................ 362/26 |
| 5,610,797 | A * | 3/1997 | Nakamura ............. 361/679.21 |
| 5,933,191 | A * | 8/1999 | Ariga et al. ................. 348/373 |
| 6,661,461 | B1 * | 12/2003 | Watanabe et al. ........... 348/370 |
| 6,822,683 | B1 * | 11/2004 | Torikai .................. 348/333.13 |
| 7,525,596 | B2 * | 4/2009 | Yamaguchi ................. 348/375 |
| 2004/0072589 | A1 * | 4/2004 | Hamamura et al. ...... 455/550.1 |
| 2004/0179135 | A1 * | 9/2004 | Battles et al. ................ 348/373 |
| 2004/0233303 | A1 * | 11/2004 | Okutani et al. ........... 348/240.3 |
| 2005/0057685 | A1 * | 3/2005 | Yamaguchi ................. 348/375 |
| 2005/0206779 | A1 * | 9/2005 | Aoki et al. .................. 348/373 |
| 2005/0219394 | A1 * | 10/2005 | Du et al. ................. 348/333.12 |
| 2006/0025084 | A1 * | 2/2006 | Kawamata ................. 455/90.2 |
| 2007/0041169 | A1 * | 2/2007 | Konet et al. .................... 362/84 |

FOREIGN PATENT DOCUMENTS

| JP | 64 53651 | 4/1989 |
| JP | 3 143076 | 6/1991 |
| JP | 7 322108 | 12/1995 |
| JP | 8 279946 | 10/1996 |
| JP | 11 143411 | 5/1999 |

* cited by examiner

Primary Examiner—Jason Chan
Assistant Examiner—Michael Osinski
(74) Attorney, Agent, or Firm—Frommer Lawrence & Haug LLP; William S. Frommer; Thomas F. Presson

(57) ABSTRACT

An imaging operation controller including a casing, a control panel attached to a back part of the casing and having a plurality of operating members and function indicators that indicate the functions of the operating members and placed near the operating members, respectively. The control panel includes a base plate attached to the casing, a mounting plate placed on the base plate and a printed indicator sheet placed on the mounting plate. The plurality of operating members are supported on the base plate, indicator lighting light sources are supported on the base plate at positions respectively corresponding to the function indicators so as to emit light backward. The indicator lighting light sources are white light-emitting diodes attached to the base plate so as to emit light backward.

10 Claims, 41 Drawing Sheets

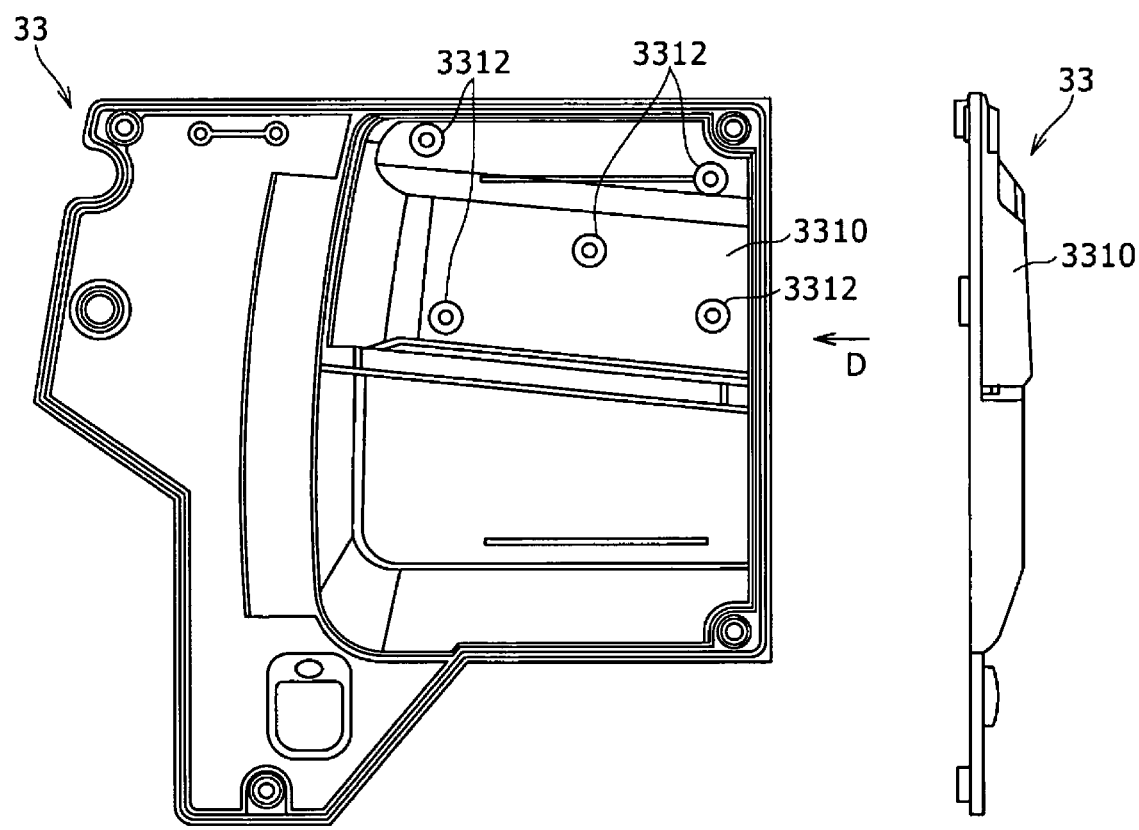

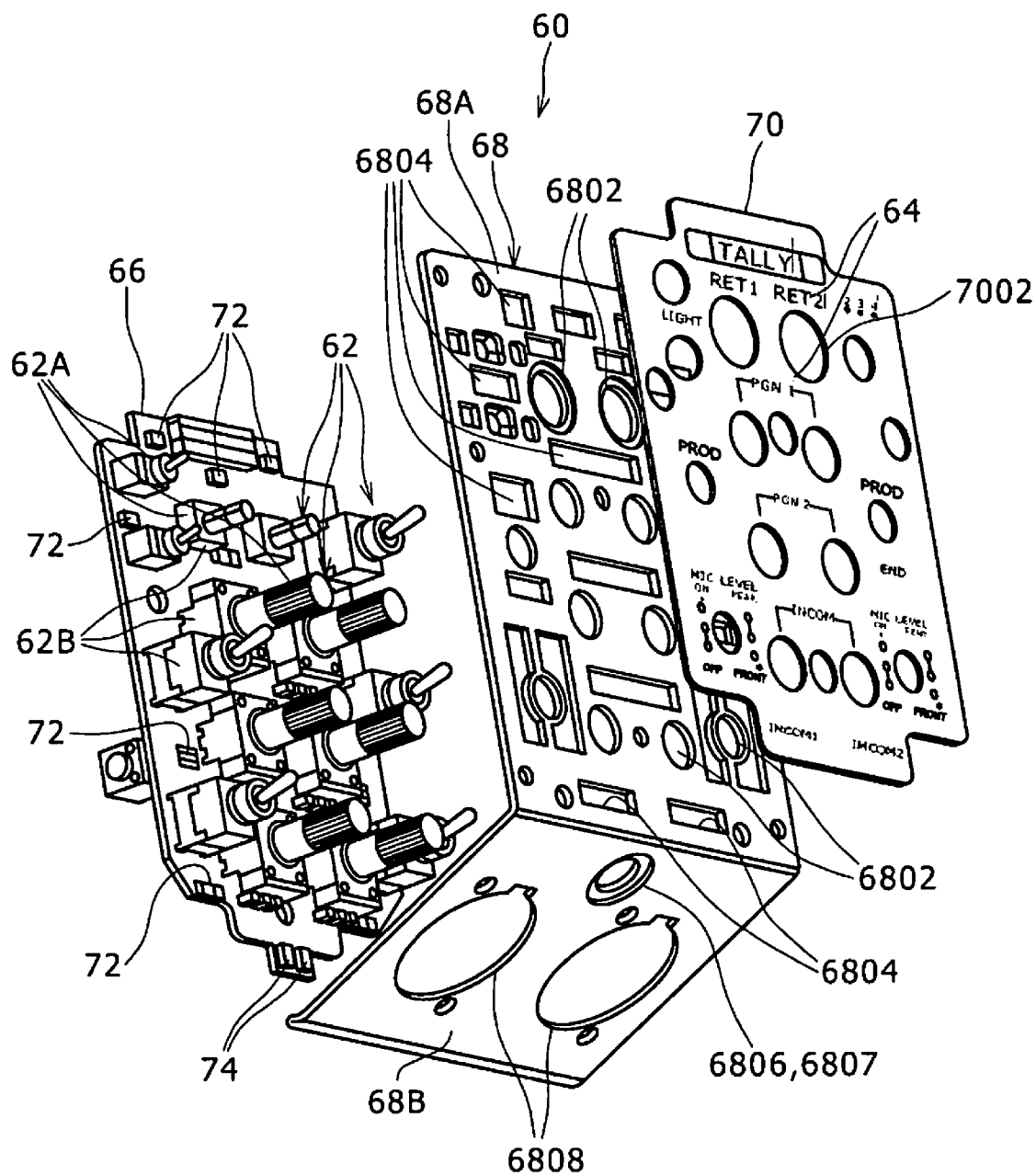

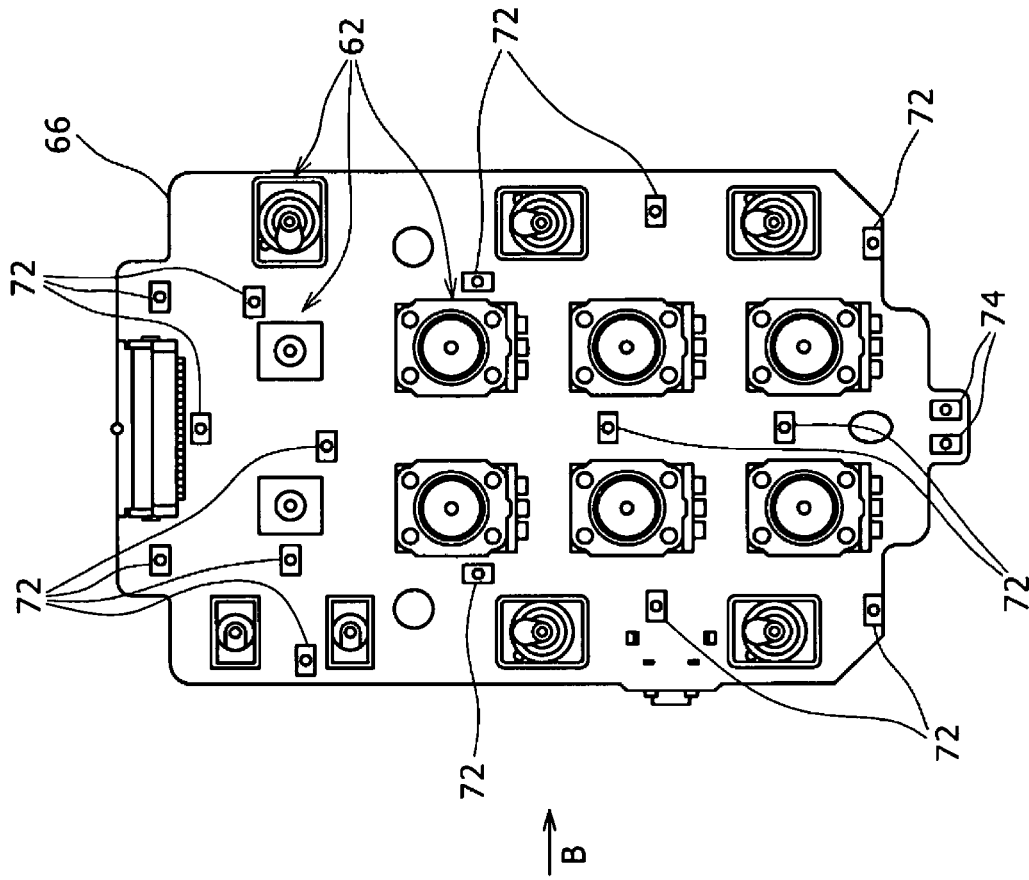
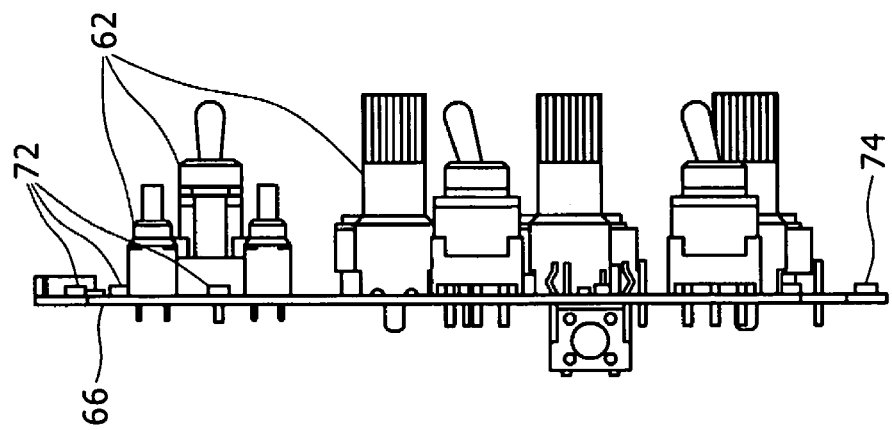

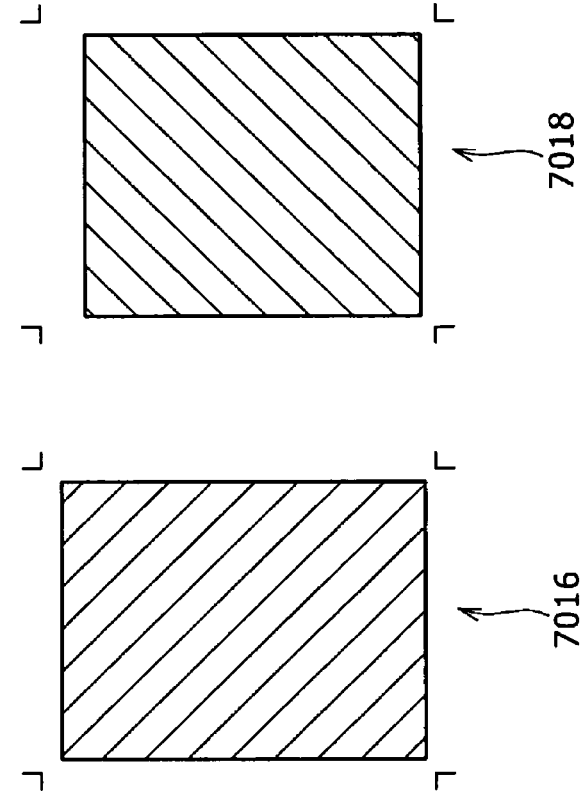
FIG.18A  FIG.18B  FIG.18C  FIG.18D
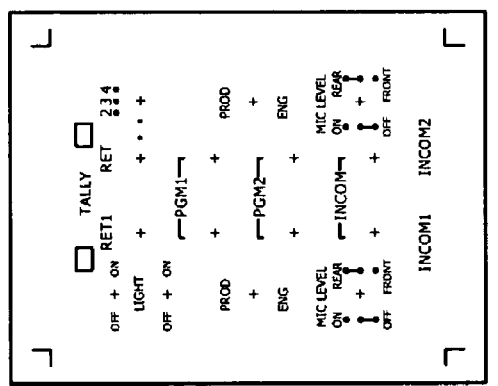
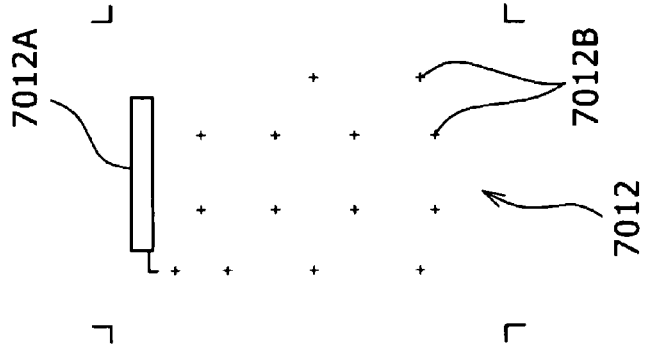

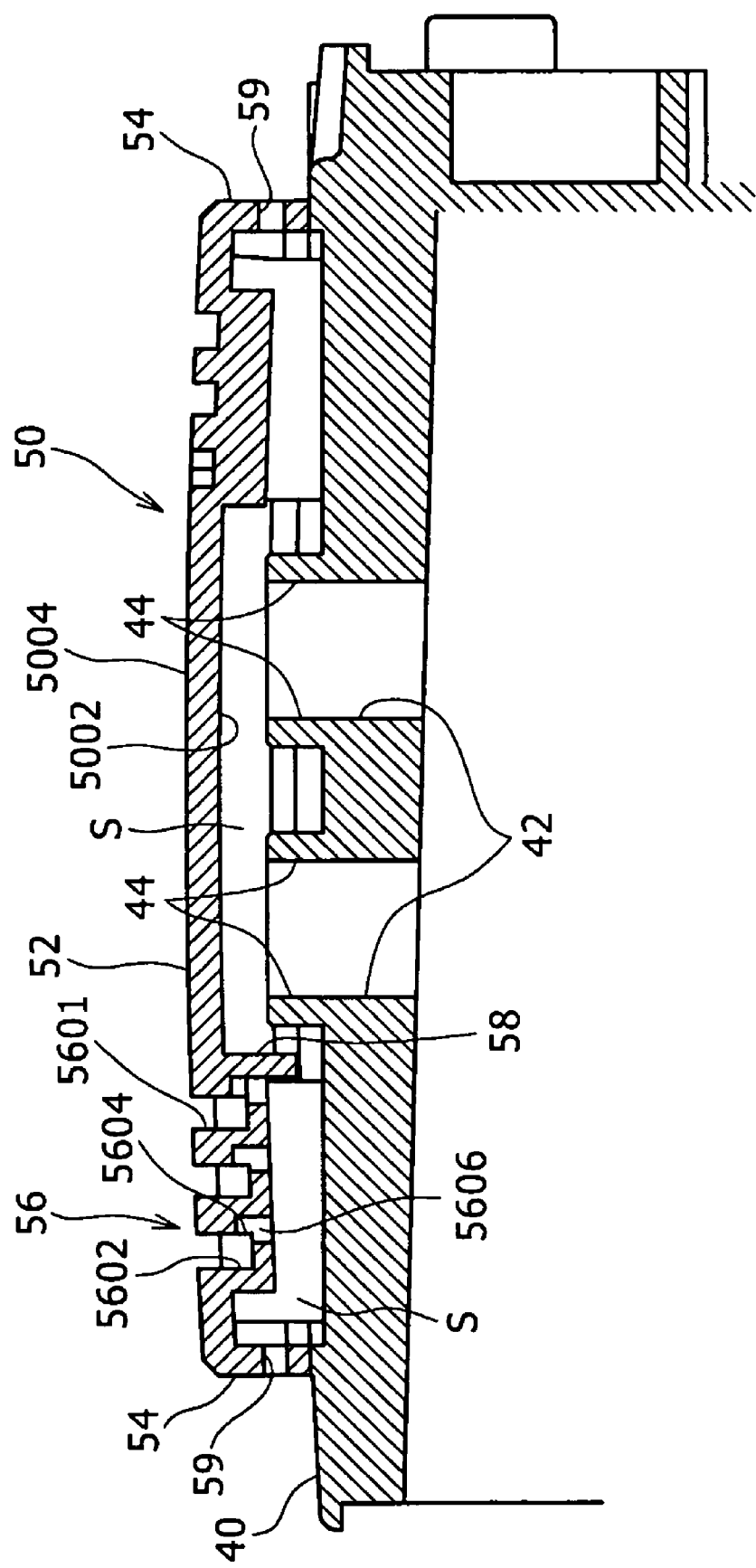

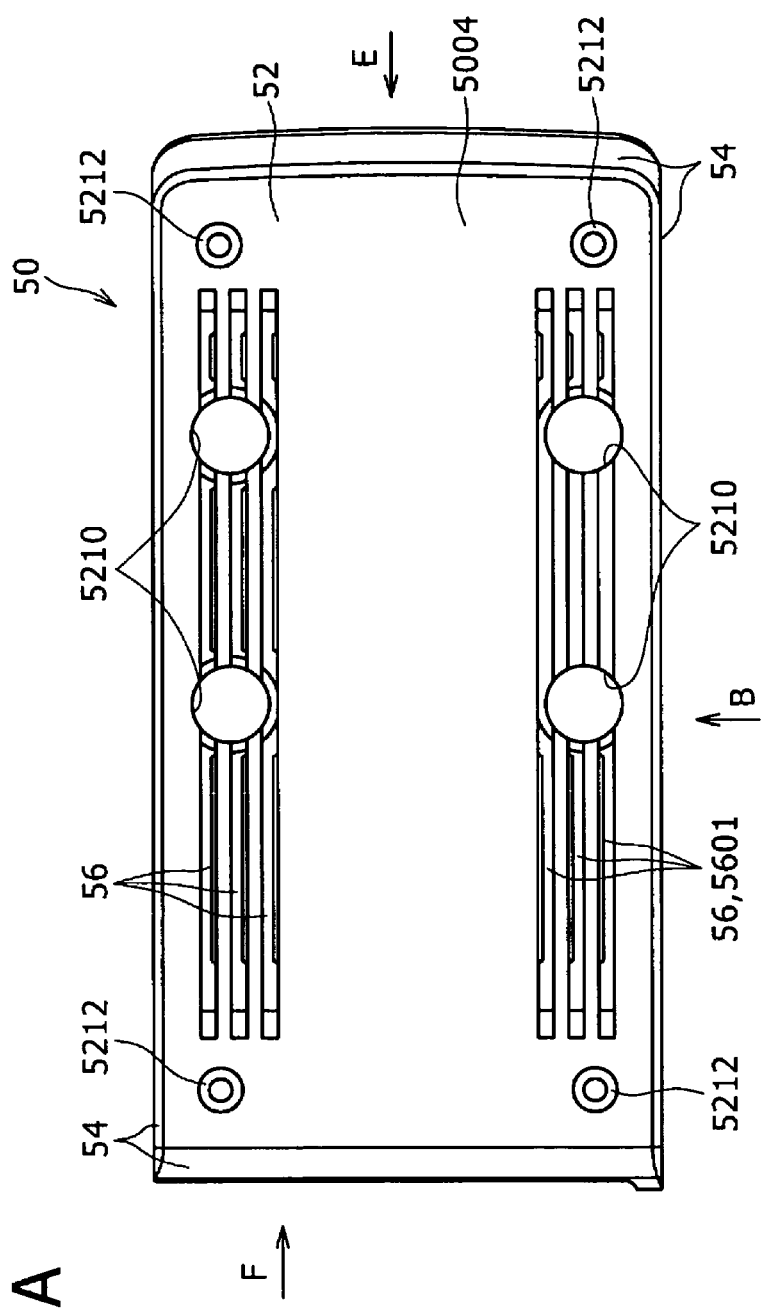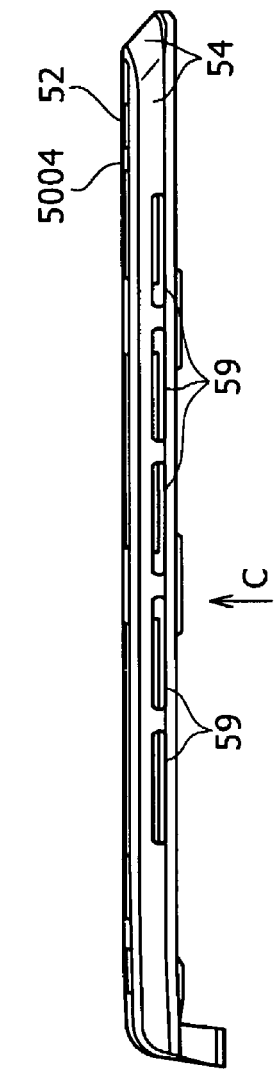
FIG.36A
FIG.36B

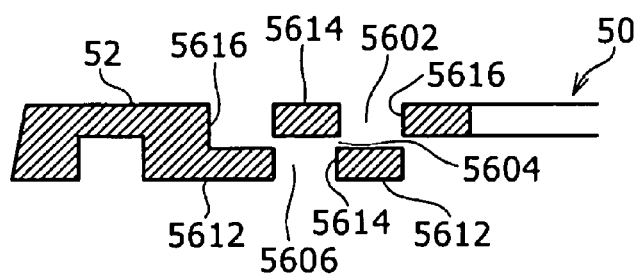
FIG.40A
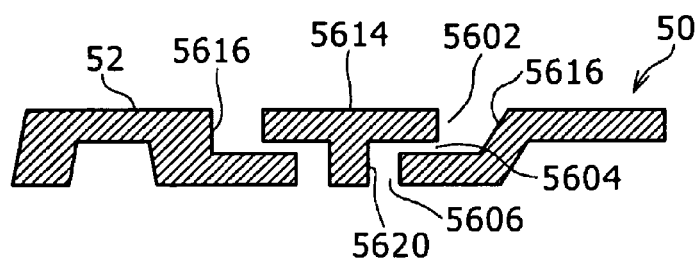
FIG.40B
FIG.41
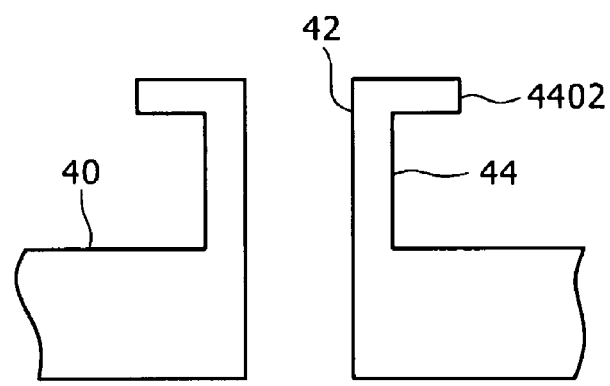
FIG.42
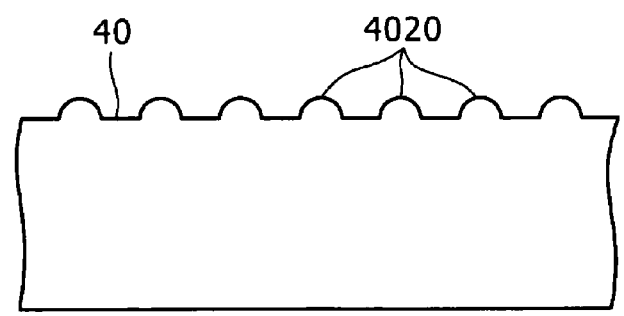

IMAGING OPERATION CONTROLLER

CROSS REFERENCES TO RELATED APPLICATIONS

The present invention contains subject matter related to Japanese Patent Application Nos. 2005-116634, 2005-116819, and 2005-117051 filed in the Japanese Patent Office on Apr. 14, 2005, the entire contents of which being incorporated herein by reference.

BACKGROUND OF THE INVENTION

1. Field of the Invention

The present invention relates to an imaging operation controller for converting image signals provided by a camera unit into video signals.

2. Description of the Related Art

A previously proposed camera, such as a business camera for business use by a professional cameraman in a broadcasting station, includes a camera unit for generating image signals representing an image of an object and an imaging operation controller for converting image signals into corresponding electric signals and sending the electric signals to an external camera controller. The camera unit and the imaging operation controller are detachably united together.

The imaging operation controller is provided with a control panel. The control panel is provided with a plurality of operating switches and operating members including an operating member for adjusting volume. The operating switches are operated to send audio signals and image signals to the camera control unit.

Function indicators represented by characters and such and indicating the functions of the operating members are printed on the control panel so as to correspond to the operating members, respectively.

When the camera including the imaging operation controller is used in a dark environment for taking an image of a scene in a studio or on a stage or for taking a night scenery, it is difficult to recognize the function indicators on the control panel visually.

A technique proposed in JP-A 11-143411 (Patent document 1) prints characters forming function indicators on a control panel with a luminous paint.

SUMMARY OF THE INVENTION

Time for which a luminous paint can maintain its luminosity is on the order of 10 min at the longest. Therefore, it is difficult to recognize the function indicators on the control panel when necessary while the camera is used for a long time in a dark environment even though the characters of the function indicators are printed with a luminous paint. Thus the function indicators printed with a luminous paint cannot improve the operability of the control panel.

The present invention has been made in view of such a problem and it is therefore desirable to provide an imaging operation controller provided with function indicators capable of ensuring the visual recognition thereof even in a dark photographing environment and of contributing to the improvement of the operability of the imaging operation controller.

An imaging operation controller according to an embodiment of the present invention detachably connectable to a camera unit for taking an image of an object and providing image signals representing the image, capable of converting the image signals received from the camera unit into corresponding electric signals and of sending the electric signals to an external device includes: a casing; and a control panel attached to the casing and provided with a plurality of operating members and function indicators indicating the functions of the operating members and placed near the operating members, respectively; wherein the control panel includes a base plate attached to the casing, a mounting plate placed on the base plate and a printed indicator sheet placed on the mounting plate, the plurality of operating members are supported on the base plate, indicator lighting light sources are supported on the base plate at positions respectively corresponding to the function indicators, the mounting plate is provided with openings in which the plurality of operating members are inserted, respectively, and windows at positions respectively corresponding to the indicator lighting light sources, the printed indicator sheet is provided with openings in which the plurality of operating members are inserted, respectively, and the function indicators are disposed on the printed indicator sheet so as to correspond to the plurality of windows, respectively.

According to the embodiment of the present invention, when the business camera is used in a dark environment for taking an image of a scene in a studio or on a stage or for taking a night scenery, the function indicators can be lighted by the plurality of indicator lighting light sources. Consequently, the user is easily able to recognize the illuminated function indicators visually and is able to operate the desired operating members correctly without making a mistake. Thus the imaging operation controller of the present invention has improved operability.

BRIEF DESCRIPTION OF THE DRAWINGS

The above and other objects, features and advantages of the present invention will become more apparent from the following description taken in connection with the accompanying drawings, in which:

FIG. 8(C) is a plan view of the covering member taken in the direction of the arrow C in FIG. 7(B);

FIG. 8(D) is a side elevation of the covering member taken in the direction of the arrow D in FIG. 8(C);

FIG. 15 is an exploded perspective view of a control panel included in the imaging operation controller embodying the present invention;

FIG. 16(A) is a plan view of a base plate included in the control panel;

FIG. 16(B) is a side elevation of the base plate taken in the direction of the arrow B in FIG. 16(A);

FIG. 18 is a view of assistance in explaining steps of making the printed indicator sheet;

FIG. 35 is a sectional view taken in the line X-X in FIG. 34;

FIG. 36(A) is a plan view of a covering member;

FIG. 36(B) is a side elevation of the covering member taken in the direction of the arrow B in FIG. 36(A);

FIG. 40(A) is a sectional view of a ventilation passage in a first modification;

FIG. 40(B) is a sectional view of a ventilation passage in a second modification;

FIG. 41 is a sectional view of apart including a ventilation passage and a standing wall;

FIG. 42 is a sectional view of an upper wall in a modification; and

DESCRIPTION OF THE PREFERRED EMBODIMENTS

The present invention will be described as applied to an imaging operation controller for a business camera. Naturally the present invention is applicable to imaging operation controllers for cameras other than business cameras.

Figure 20:
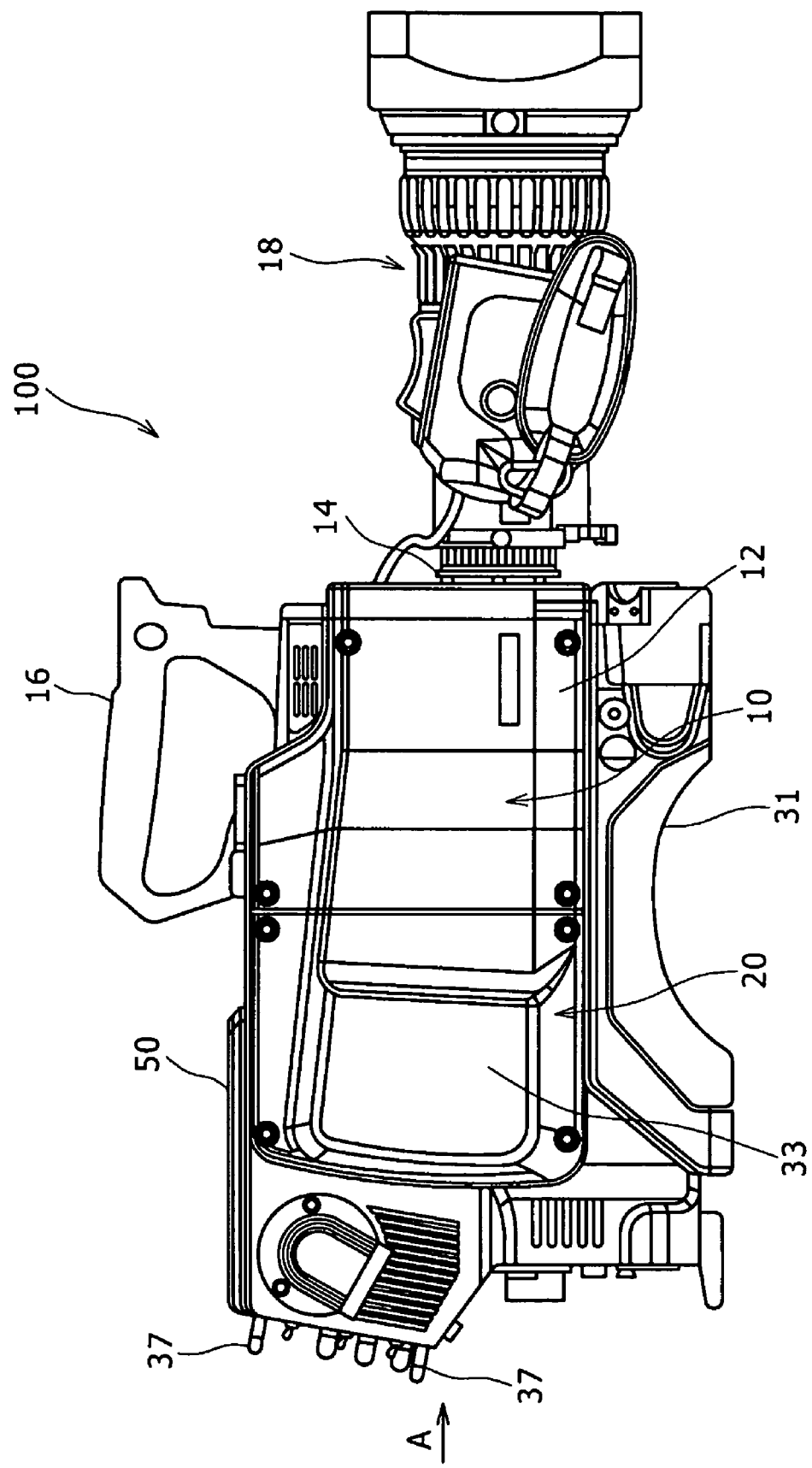
FIG. 20 is a side elevation of the right side of a business camera provided with the imaging operation controller embodying the present invention.
Figure 21:
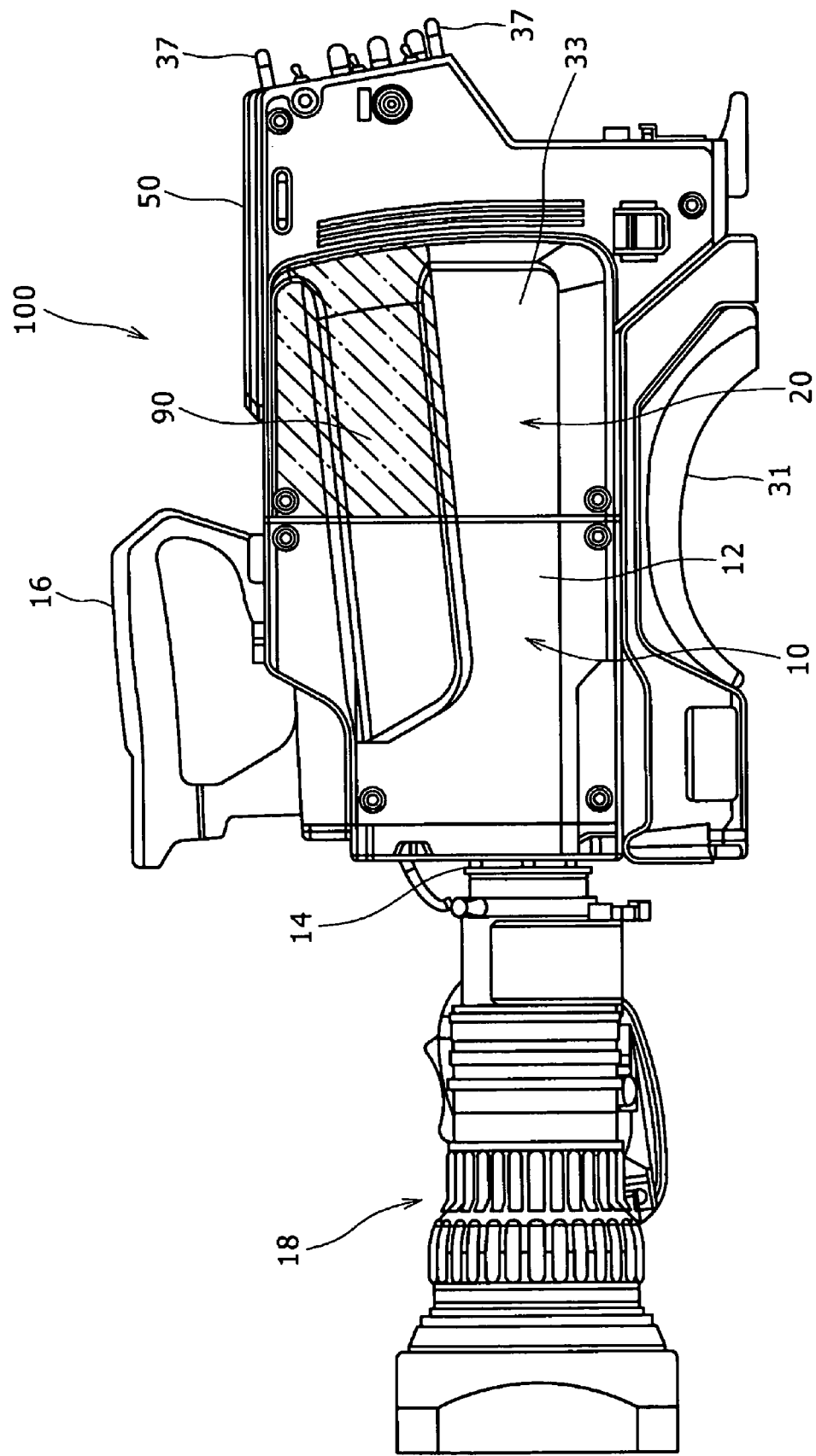
FIG. 21 is a side elevation, of the business camera shown in FIG. 20, showing the left side of the business camera.
Figure 22:
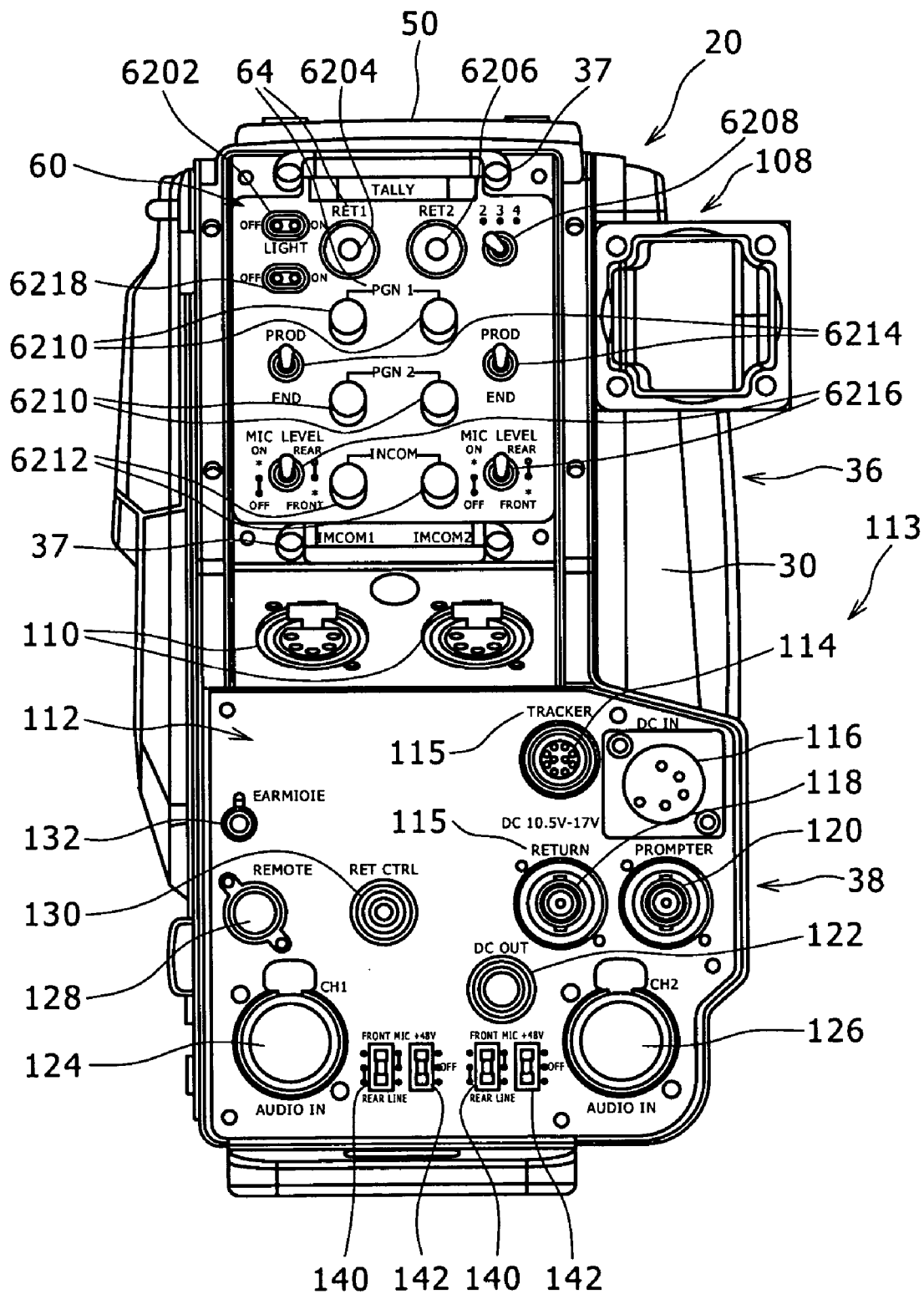
FIG. 22 is an end view of the business camera taken in the direction of the arrow A in FIG. 20.

Referring to FIGS. 20 to 22, a business camera 100 includes a camera unit 10 and an imaging operation controller 20, namely, an electronic device. The imaging operation controller 20 is detachably connected to a back part of the camera unit 10.

A plurality of business cameras 100 are used simultaneously. The respective imaging operation controller 20 of the plurality of business cameras 100 are connected respectively to camera control units by cables. The camera control units are connected to a master controller. The business cameras 100 and the master controller or the business cameras 100 and the camera controllers exchange video and audio signals. The business cameras 100 exchange audio signals.

The camera unit 10 includes a casing 12 holding an image pickup device, a lens adapter 14 connected to the front wall of the casing 12, and a handle 16 attached to the upper wall of the casing 12. Light reflected from an object travels through the lens adapter 14 and falls on the image pickup device.

An interchangeable lens 18 is detachably mounted on the lens adapter 14.

First Embodiment

A control panel 60 will be described with reference to FIGS. 15 to 19 and 21.

Figure 17:
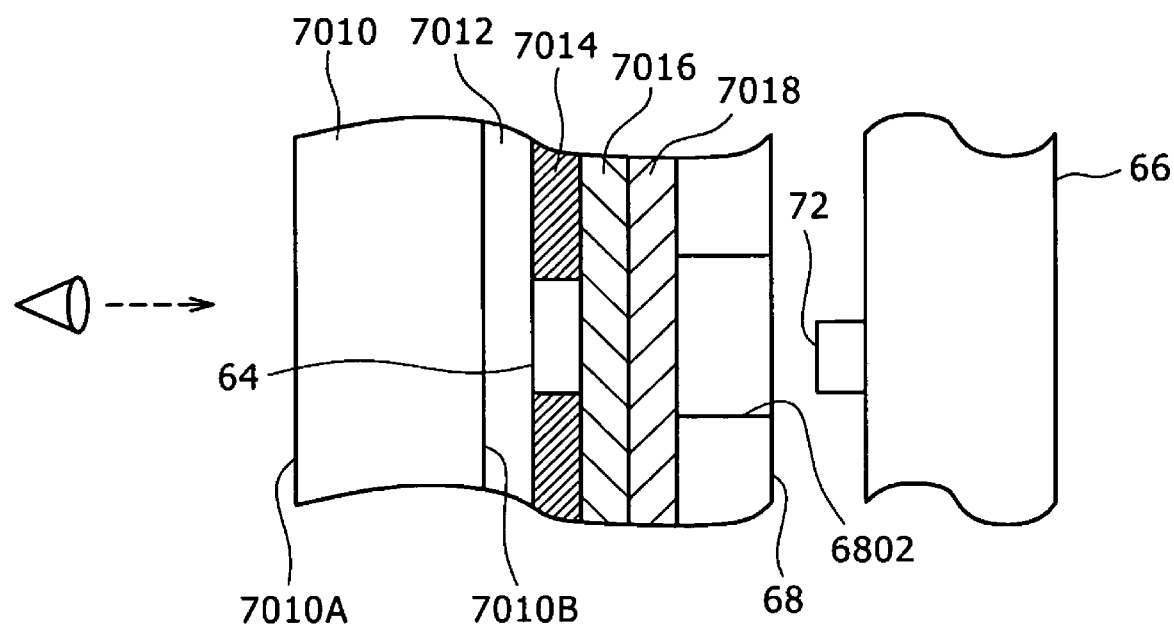
FIG. 17 is a sectional view of a printed indicator sheet.

FIG. 15 is an exploded perspective view of the control panel 60 included in an imaging operation controller embodying the present invention, FIG. 16(A) is a plan view of a base plate 66 included in the control panel 60, FIG. 16(B) is a side elevation of the base plate 66 taken in the direction of the arrow B in FIG. 16(A), FIG. 17 is a sectional view of a printed indicator sheet and FIG. 18 is a view of assistance in explaining steps of making the printed indicator sheet.

Referring to FIG. 22, the control panel 60 is attached to a back part 36 of a casing 30. The control panel 60 is provided with a plurality of operating members 62 for operating the imaging operation controller 20, and function indicators 64 indicating the functions of the operating members 62. The function indicators 64 are marked at positions near the operating members 62, respectively.

As show in FIG. 20, guard bars 37 are attached to the back part 36 at positions corresponding to the upper and the lower end of the operating panel 60 so as to protrude backward.

As shown in FIG. 22, the operating members 62 include TALLY switch 6202 to be operated to exchange image signals with the camera control unit, a RET1 button 6204, a RET button 6206, a RET2/3/4 switch 6208, a PGM (program) ½ level adjusting knob 6210 to be operated for audio signal exchange through an intercommunicating system, an INCOM level adjusting knob 6212, a PROD/ENG switch 6214, a MIC/LEVEL switch 6215, and a light source control switch 6218 for switching on and off light sources.

The function indicator 64 for the RET1 button 6204 indicates "RET1". The function indicator 64 for the PGM ½ level adjusting knob indicates "PGM1" and "PGM2". The function indicator 62 for the light source control switch 6218 indicates "LIGHT", "ON" and "OFF".

Referring to FIG. 15, the control panel 60 includes a base plate 66 attached to the back part 36 of the casing 30, a mounting plate 68 placed on the base plate 66 and a printed indicator sheet 70 placed on the mounting plate 68.

As shown in FIGS. 15 and 16, the operating members 62 are supported on the base plate 66. Indicator lighting light sources 72 are supported on the base plate 66 so as to face backward at positions corresponding to the function indicators 64, respectively.

In FIG. 15, indicated at 62A are levers for lever switches, buttons for push button switches and turning knobs for volume controllers and indicated at 62B are cases containing electric contacts and sliders to be operated by operating the operating members 62.

The indicator lighting light sources 72 are white light-emitting diodes attached to the base plate 66 so as to emit light backward.

Illuminating light sources 74 are white light-emitting diodes attached to a lower part of the base plate 66 so as to emit light downward.

The color of light emitted by the indicator lighting light sources 72 and the illuminating light sources 74 may be any suitable color other than white.

Figure 19:
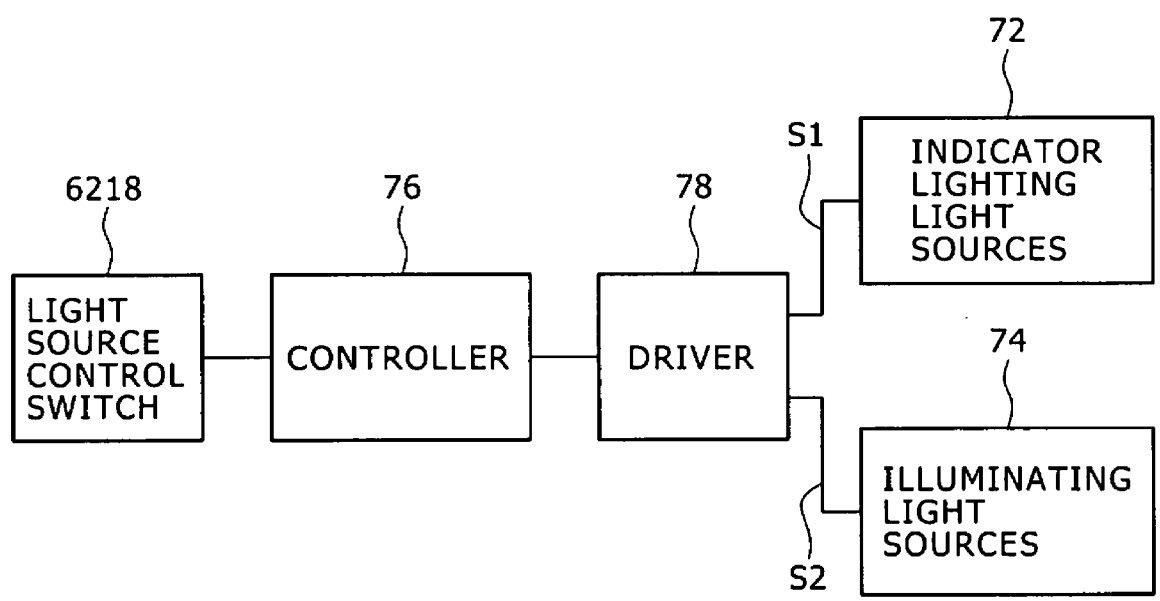
FIG. 19 is a block diagram of a control system for controlling a plurality of indicator lighting light sources and illuminating light sources.

Control operations for switching on and off the indicator lighting light sources 72 and the illuminating light sources 74 will be described with reference to FIG. 19 showing a control system for controlling the indicator lighting light sources 72 and the illuminating light sources 74 in a block diagram.

The control system supported on the base plate 66 to control the indicator lighting light sources 72 and the illuminating light sources 74 includes the light source control switch 6218, a controller 76 and a driver 78.

The light source control switch 6218 is a lever switch capable of selectively set to one of positions "LIGHT", "ON" and "OFF".

The driver 78 generates a first drive signal S1 for switching on the indicator lighting light sources 72 and a second drive signal S2 for switching on the illuminating light sources 74. The first drive signal S1 is given to the indicator lighting light sources 72 and the second drive signal S2 is given to the illuminating light sources 74.

The controller 76 makes the driver 78 generate or makes the driver 78 stop generating the first drive signal S1 and the second drive signal S2 according to the condition of the light source control switch 6218.

The controller 76 and the driver 78 may be any suitable known circuits, such as computers or digital ICs.

When the light source control switch 6218 is set to the position "LIGHT", the controller 76 makes the driver 78 stop generating the first drive signal S1 and generate the second drive signal S2. Consequently, all the plurality of indicator lighting light sources 72 are switched on and the illuminating light sources 74 are switched off.

When the light source control switch 6218 is set to the position "ON", the controller 76 makes the driver 78 generate both the first drive signal S1 and the second drive signal S2. Consequently, both the plurality of indicator lighting light sources 72 and the illuminating light sources 74 are switched on.

When the light source control switch 6218 is set to the position "OFF", the controller 76 makes the driver 78 stop generating both the first drive signal S1 and the second drive signal S2. Consequently, all the plurality of indicator lighting light sources 72 and the illuminating light sources 74 are switched off.

As shown in FIG. 15, the mounting plate 68 has a first flat part 68A superposed on the base plate 66 and a second flat part 68B extending at an angle to the first flat part 68A from the lower end of the first flat part 68A.

The first flat part 68A is provided with openings 6802 in which the plurality of operating members 62 are inserted, respectively, and with windows 6804 at positions respectively corresponding to the indicator lighting light sources 72. The windows 6804 are formed in sizes and shapes corresponding to those of the function indicators 64, respectively.

The second flat part 68B is provided with an illumination window 6806 at a position corresponding to the illuminating light sources 74. A diffuser 6807 for diffusing light is fitted in the illumination window 6806.

The second flat part 68B is provided with two openings 6808 for two connectors 110 for connecting the control panel 60 to an intercommunicating system.

As shown in FIG. 15, the printed indicator sheet 70 is provided with openings 7002 for the plurality of operating members 62, and the function indicators 64 are formed in parts respectively corresponding to the plurality of windows 6804.

Referring to FIG. 17, the printed indicator sheet 70 is a multilayer laminated sheet formed by superposing four printed layers 7012, 7014, 7016 and 7018 on a transparent base 7010.

The transparent base 7010 has major surfaces; one of the major surfaces is a front surface 7010A and the other is a back surface 7010B.

The multilayer printed indicator sheet 70 is fabricated by the following method.

First, the first printed layer 7012 is formed on the back surface 7010B of the transparent base 7010 as shown in FIG. 17.

As shown in FIG. 18(A), the first printed layer 7012 is provided with a frame 7012A of a white coating material and marks 7012B indicating the positions of the openings 7002.

The second printed layer 7014 is formed on the first printed layer 7012 as shown in FIG. 17.

As shown in FIG. 18(B), the second printed layer 7014 is formed of an opaque coating material, such as an opaque black coating material. The second printed layer 7014 coats the back surface 7010B entirely excluding the function indicators 64. More specifically, the second printed layer 7014 is formed in a rectangular shape so as to cover the back surface 7010B of the transparent base 7010 entirely leaving regions corresponding to the function indicators 64 indicating the functions of the operating members 62 uncoated.

Thus the function indicators 64 are patterns of outline characters in the second printed layer 7014.

Then, the third printed layer 7016 is formed on the second printed layer 7014 as shown in FIG. 17.

As shown in FIG. 18(C), the third printed layer 7016 is formed of a semitransparent coating material (a semitransparent white coating material in this embodiment) on the second printed layer 7014. The third printed layer 7016 has a rectangular shape smaller than the rectangular shape of the second printed layer 7014. The third printed layer 7016 covers a region containing all the function indicators 64. Three-dimensional third printed layer 7016 may cover only regions corresponding to the function indicators 64.

Then the fourth printed layer 7018 is formed on the third printed layer 7016 as shown in FIG. 17.

As shown in FIG. 18(D), the fourth printed layer 7018 is formed of a semitransparent coating material (an semitransparent orange coating material in this embodiment) The fourth printed layer 7018 has a rectangular shape covering all the function indicators 64 excluding the uppermost function indicator 64. Thus the third printed layer 7016 has an upper end area not covered with the fourth printed layer 7018.

If the printed layers are formed on the front surface 7010A of the transparent base 7010, the printed layers are likely to come off when an obstacle collides against the printed layers. The printed layers formed on the back surface 7010B will not be caused to come off by an obstacle.

Indicating functions of the function indicators 64 of the printed indicator sheet 70 will be described.

Referring to FIG. 17, the fourth printed layer 7018 of the printed indicator sheet 70 is attached to the mounting plate 68.

When the indicator lighting light sources 72 arranged in a region behind the back surface 7010B of the transparent base 7010 corresponding to the fourth printed layer 7018 are switched on, light emitted by the indicator lighting light sources 72 travels through the openings 6802 of the mounting plate 68 and the orange fourth printed layer 7018 and becomes orange light. Then, the orange light travels through the third printed layer 7016, the function indicators 64 formed in the second printed layer 7014, the first printed layer 7016 and the transparent base 7010 and travels backward through the front surface 7010A.

When the control panel 60 is seen from behind the transparent base 7010, i.e., from behind the casing 30, the function indicators 64 are lighted in orange.

When the indicator lighting light sources 72 arranged in a region not corresponding to the fourth printed layer 7018 and corresponding to only the third printed layer 7016 are switched on, light emitted by the indicator lighting light sources 72 traveled through the third printed layer 7016 becomes white light. Then, the white light travels through the function indicators 64 formed in the second printed layer 7014, the first printed layer 7016 and the transparent base 7010 and travels backward from the front surface 7010A.

When the control panel 60 is seen from behind the transparent base 7010, i.e., from behind the casing 30, the function indicators 64 are lighted in white.

When the indicator lighting light sources 72 are switched off and a bright environment extends behind the casing 30, external light falling on the front surface 7010A of the transparent base 7010 travels backward through the back surface 7010B, the first printed layer 7012, the function indicators 64 of the second printed layer 7014 and falls on the third printed layer 7016.

Then, the third printed layer 7016 reflects white light. The reflected white light travels backward through the function indicators 64 of the second printed layer 7014, the first printed layer 7012 and the transparent base 7010 and then travels backward from the front surface 7010A.

When the control panel 60 is seen from behind the casing 30, the function indicators 64 are lighted in white.

Thus the control panel 60 including the base plate 66, the mounting plate 68 and the printed sheet 70 has the following advantages. If the light source control switch 6218 is set to the position "LIGHT" when the business camera 100 is used in a dark environment in a studio, on a stage or at night, the plurality of indicator lighting light sources 72 are switched on and the illuminating light sources 74 are switched off. Consequently, the user can easily recognize the function indicators 64 illuminated by the indicator lighting light sources 72 and can correctly operate the desired operating members 62 without fail. Thus the operability of the business camera 100 can be improved.

If the light source control switch 6218 is set to the position "ON", both the indicator lighting light sources 72 and the illuminating light sources 74 are switched on. Consequently, the function indicators 64 are illuminated and light emitted by the illuminating light sources 74 is diffused by the diffuser 6807 fitted in the illumination opening 6806 and the diffused light illuminates a nearby space extending under the control panel 60 and around the user. The diffused light facilitates reading a document, such as a script, and to visually recognizing time on the watch even in a dark environment. Thus the convenience of the business camera 100 can be improved.

If the light source control switch 6218 is set to the position "OFF", both the plurality of indicator lighting light sources 72 and the illuminating light sources 74 are switched off. Thus the function indicators 64 and the diffusers 6807 can be advantageously darkened in a dark environment where emission of light is desired to be reduced to the least possible extent.

When the business camera 100 is used in a light environment, such as an outdoor place in the daytime, the light source control switch 6218 is set to the position "OFF" to switch off both the indicator lighting light sources 72 and the illuminating light sources 74. Consequently, the function indicators 64 lighted by outdoor light look white and can be easily recognized. Even if the first drive signal S1 and the second drive signal S2 are not given to the indicator lighting light sources 72 and the illuminating light sources 74 to save power when the business camera 100 is used in a light environment, the function indicators 64 can be satisfactorily recognized.

If the control panel of the business camera 100 is provided with function indicators formed by printing a luminous paint, the function indicators remain luminous for a predetermined time. Therefore, when the business camera 100 is used fore taking scenes in a concert hall or a television studio, the luminous function indicators will be in the field of view of an audience behind the business camera 100 and will hinder the enjoyment of the audience. If the business camera 100 is moved or turned and the luminous function indicators come occasionally into audience's view, the luminous function indicators look like flickering and obstruct the audience's view.

The indicator lighting light sources 72 for illuminating the function indicators 64 and the illuminating light sources 74 can be properly switched on and off according to the condition and the environment of image pickup operations by operating the light source control switch 6218. Therefore, it is possible to prevent surely the obstruction of the enjoyment of the audience by the lighted function indicators 64.

The imaging operation controller 20 in this embodiment has been described on an assumption that the imaging operation controller 20 can be selectively set in an operating state where the plurality of indicator lighting light sources 72 are switched on and the illuminating light sources 74 are switched off, an operating state where both the plurality of indicator lighting light sources 72 and the illuminating light sources 74 are switched on or an operating state where both the plurality of indicator lighting light sources 72 and the illuminating light sources 74 are switched off. The operating state of the imaging operation controller 20 is not limited to one of the foregoing three operating states and may be one of operating states each determined by a condition of the indicator lighting light sources 72 and that of the illuminating light sources 74 other than the foregoing three operating states.

For example, when the imaging operation controller 20 is set in an operating state where the plurality of indicator lighting light sources 72 are switched off and the illuminating light sources 74 are switched on, the nearby space around the user can be illuminated without lighting the function indicators 64.

The state where both the plurality of indicator lighting light sources 72 and the illuminating light sources 74 may be replaced with a state where the indicator lighting light sources 72 are switched off and the illuminating light sources 74 are switched on.

The imaging operation controller 20 may be provided with a light source switching mode selecting device for selecting a continuous lighting mode in which the indicator lighting light sources 72 are kept turned on or a flickering mode in which the indicator lighting light sources 72 are flickered, and an illuminating light source switching mode selecting device for selecting a continuous lighting mode in which the illuminating light sources 74 are kept turned on or a flickering mode in which the illuminating light sources 74 are flickered.

It is difficult to find out the light source control switch 6218 if both the indicator lighting light sources 72 and the illuminating light sources 74 are switched off in a dark environment.

Each of the guard bars 37 may be provided with a touch sensor, which generates a detection signal upon contact with an object, such as a person, and sends the detection signal to the controller 76, and the controller 76 may send the first drive signal S1 to the indicator lighting light sources 72 upon the reception of the detection signal from the touch sensor.

Since the guard bars 37 project backward from the upper and the lower part of the control panel 60, the guard bars 37 can be easily found by groping even in a dark environment. Thus an operation for lighting the function indicators 64 can be easily achieved even in a dark environment and the function indicators 64 can be visually recognized.

The first drive signal S1 may be continuously given to the plurality of indicator lighting light sources 72 or may be given to the plurality of indicator lighting light sources 72 for a predetermined time of, for example, about 10 s and the supply of the first drive signal S1 may be stopper after the passage of the predetermined time. The light source control switch 6218 can be operated while the plurality of indicator lighting light sources 72 are on.

The imaging operation controller 20 maybe provided with a photosensor capable of sensing the brightness of the ambience. A signal generated by the photosensor may be given to the controller 76 and the controller 76 may supply the first drive signal S1 to the plurality of indicator lighting light sources 72 when the controller 76 decides on the basis of the signal provided by the photosensor that the brightness of the environment is lower than a predetermined brightness. The predetermined brightness is such a brightness that enables the visual recognition of the function indicators 64 with difficulty.

When the imaging operation controller 20 is thus constructed, the function indicators 64 can be automatically lighted in a dark environment without resorting to manual means, which advantageously improves the convenience of the imaging operation controller 20.

The imaging operation controller 20 may be provided with a luminous intensity adjusting device for adjusting the luminous intensities of the plurality of indicator lighting light sources 72 and the illuminating light sources 74. The luminous intensities of the plurality of indicator lighting light sources 72 and the illuminating light sources 74 can be adjusted by adjusting the level of both or one of the first drive signal S1 and the second drive signal S1 supplied to the plurality of indicator lighting light sources 72 and the illuminating light sources 74 by the driver 78.

The luminous intensity adjusting device has an operating member (a control switch and an operating knob) similarly to the operating member 62. The operating member of the luminous intensity adjusting device may be placed on the control panel 60 and is operated to adjust the luminance of the plurality of indicator lighting light sources 72 and the illuminating light sources 74.

Figure 24:
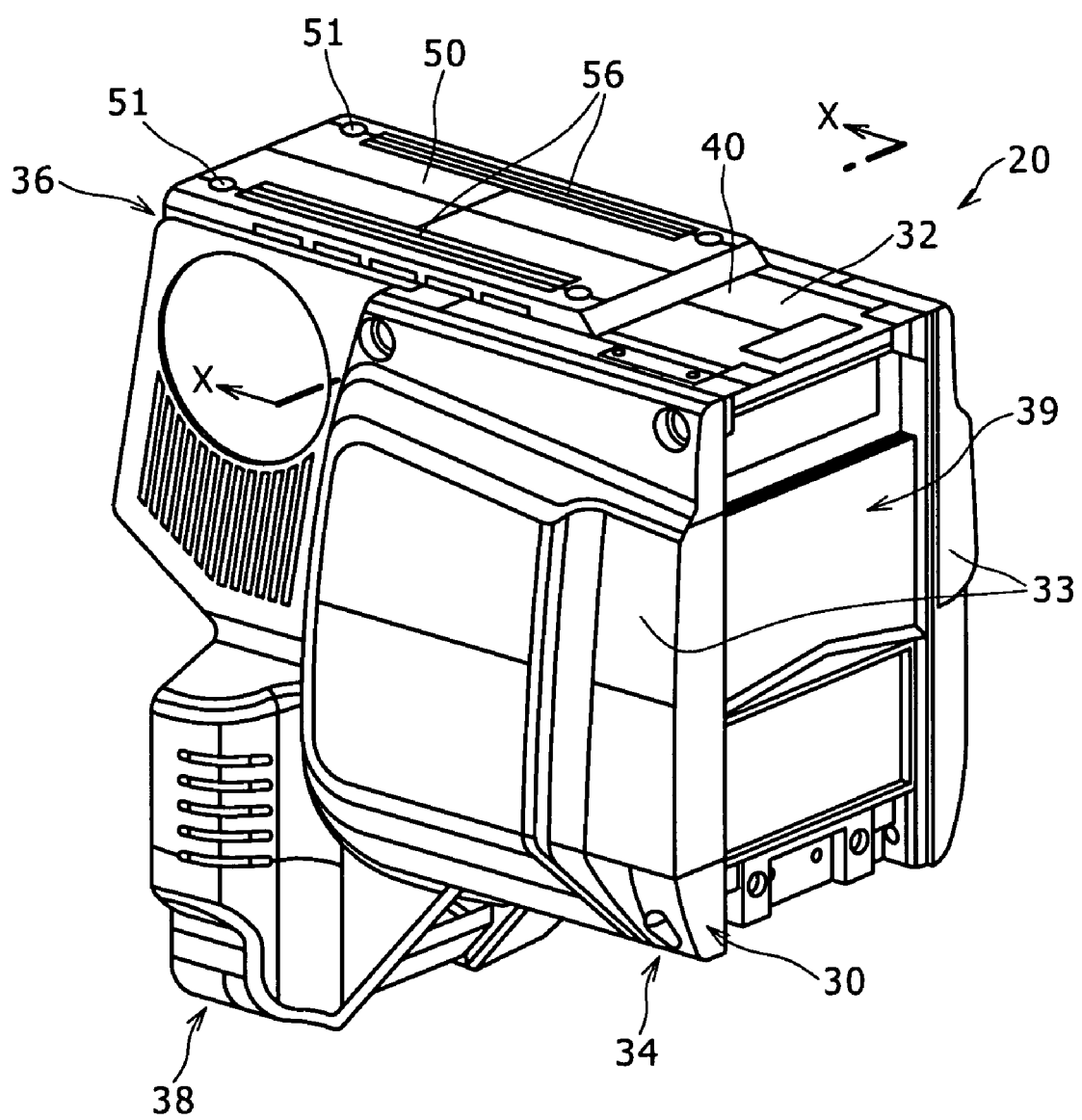
FIG. 24 is a perspective view of the imaging operation controller embodying the present invention.
Figure 25:
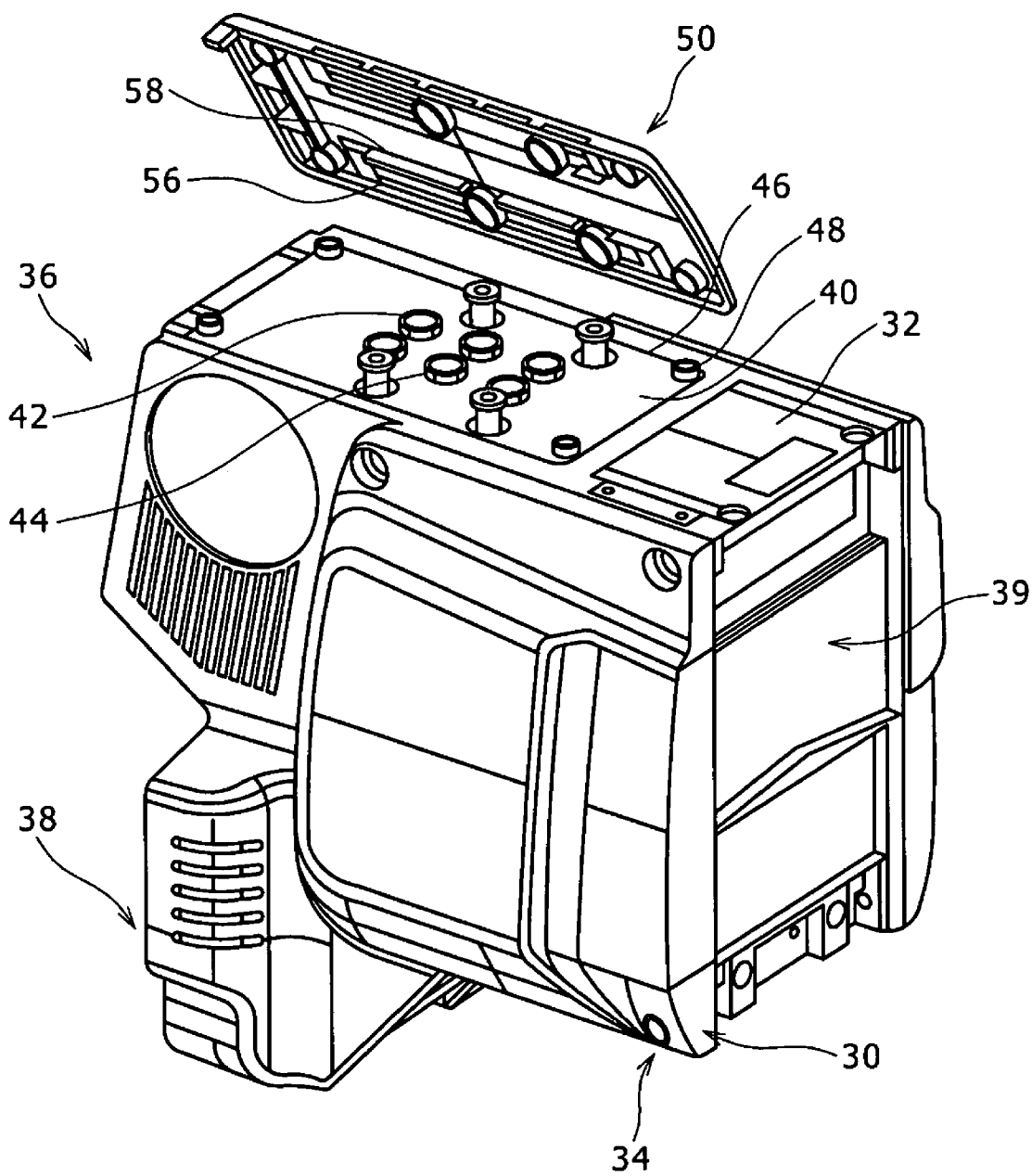
FIG. 25 is a perspective view of the imaging operation controller shown in FIG. 24, in which a covering member removed.

When the imaging operation controller 20 is provided with the luminous intensity adjusting device, the luminous intensities of the plurality of indicator lighting light sources 72 and the illuminating light sources 74 can be adjusted to enable the user to recognize visually the function indicators 64 and nearby objects easily, Second Embodiment Referring to FIGS. 24 and 25, an imaging operation controller 20 in a second embodiment according to the present invention includes a casing 30, electronic devices held in the casing 30 and a cover 50. In this specification, the terms "right" and "left" are used to specify things and positions on the right and the left side of the imaging operation controller 20 as viewed from behind the imaging operation controller 20.

The casing 30 includes a frame 32 having a height, namely, a vertical dimension, a length, namely, a longitudinal dimension, and a width, namely, a lateral dimension, and covering members 33 attached to the frame 32.

A shoulder guard 31 is extended along the lower walls of the casing 14 of a camera unit 10 and the lower wall of the casing 30 of the imaging operation controller 20. The shoulder guard 31 defines an upward convex recess for receiving the user's shoulder (FIGS. 20 and 21).

Figure 27:
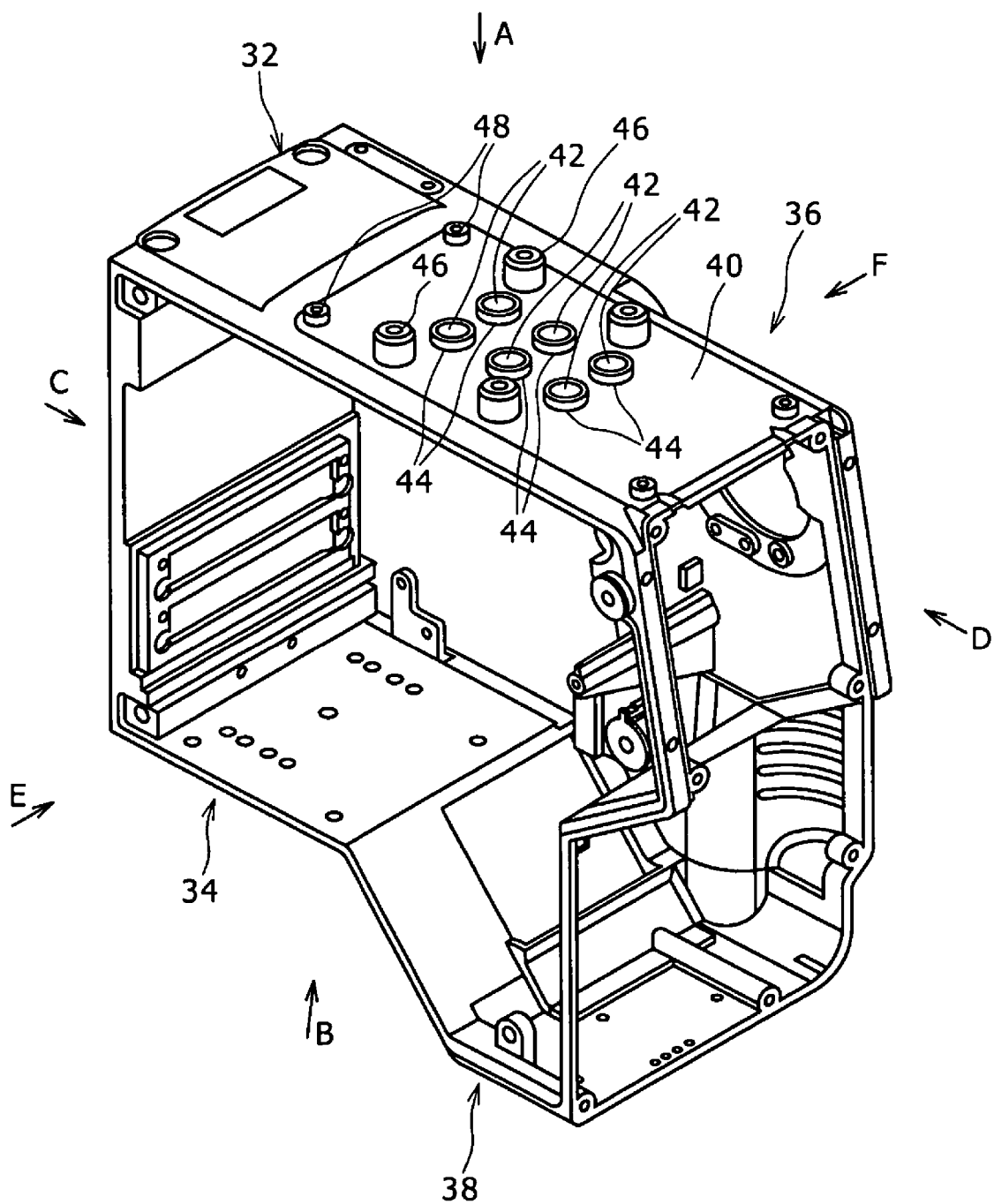
FIG. 27 is a perspective view of a frame included in the imaging operation controller embodying the present invention.

As shown in FIG. 27, the frame 32 has a front part 34, a back part 36 extending backward from the back end of the front part 34, and a lower part 38 extending backward from the lower back end of the front part 34.

Figure 23:
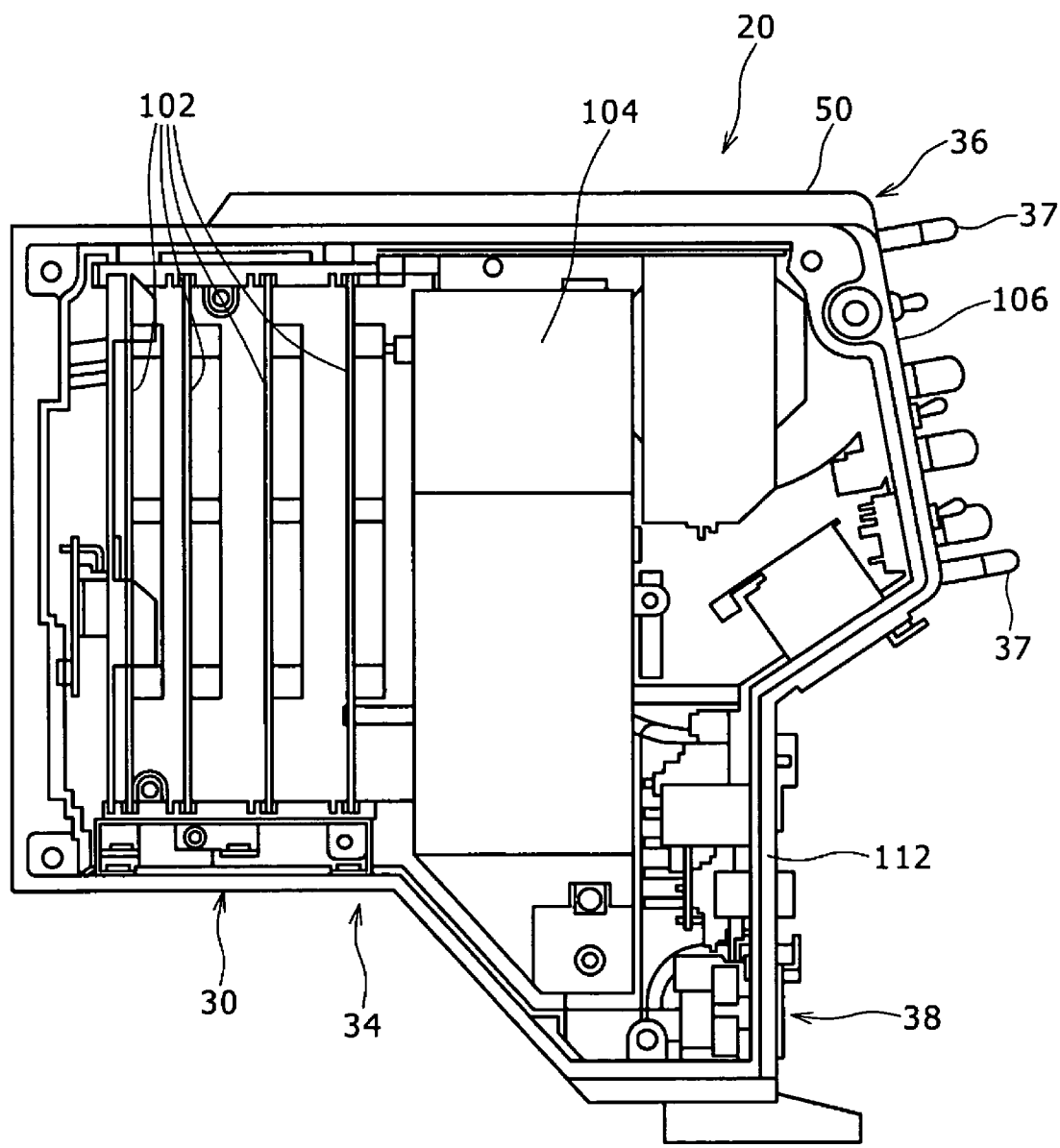
FIG. 23 is a sectional view of the imaging operation controller embodying the present invention.

As shown in FIG. 23, a plurality of printed wiring boards 102 forming an electric system are held in the front part 34.

As shown in FIG. 22, a connector 108 is placed on one of the side surfaces of the back part 36. The imaging operation controller 20 is connected by a cable connected to the connector 108 to the camera control unit. Two connectors 110 are placed on an inclined wall extending obliquely downward of the back part 36. The imaging operation controller 20 and an intercommunicating system exchange acoustic signals through the connectors 110.

A control panel 60 is attached to the back part 36. The control panel 60 is provided with a plurality of operating members 62 and function indicators 64.

A connector panel 112 is attached to the back part 36. The connector panel 112 is provided with a plurality of connectors 113.

The electric system is capable of converting image signals provided by a camera unit 10 into video signals, such as component signals Y/R-Y/B-Y signals and of sending the video signals to the camera control unit. The video signals are electric signals or optical signals.

The electric unit has functions to exchange images and sounds and to supply power to external devices.

As shown in FIG. 24, a connecting structure 34 is formed on the front side of the front part 34 of the frame 32. The imaging operation controller 20 is detachably connected to the back end of the camera unit 10 by the connecting structure 34.

More specifically, an upper wall 40 is placed on the frame 32 of the casing 30 so as to cover the respective upper surfaces of the front part 34 and the back part 36 as shown in FIG. 25.

A cover 50 is detachably attached to the upper wall 40 so as to cover the upper wall 40 with a space S defined between the upper wall 40 and the cover 50.

Figure 28:
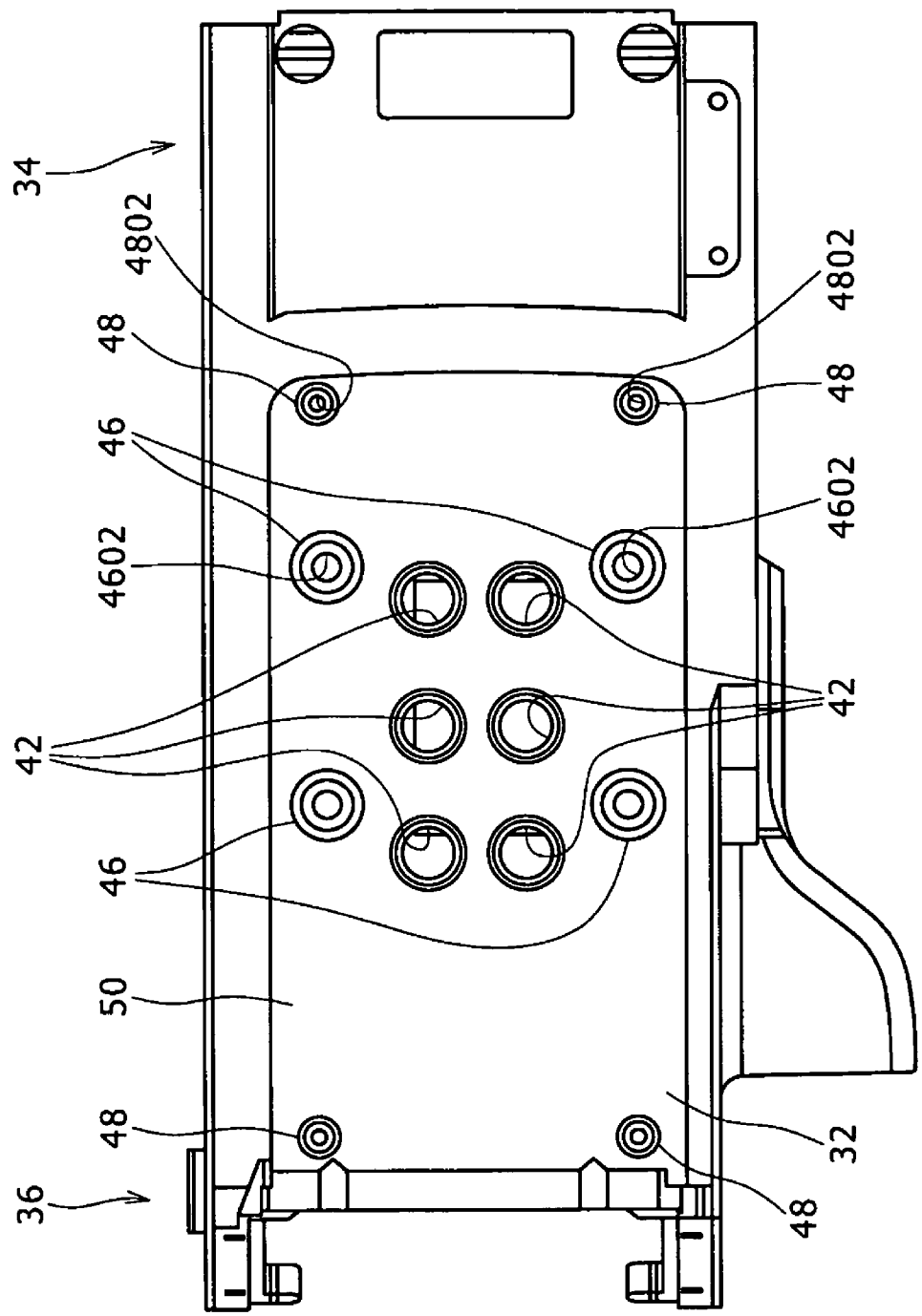
FIG. 28 is a view taken in the direction of the arrow A in FIG. 27.
Figure 29:
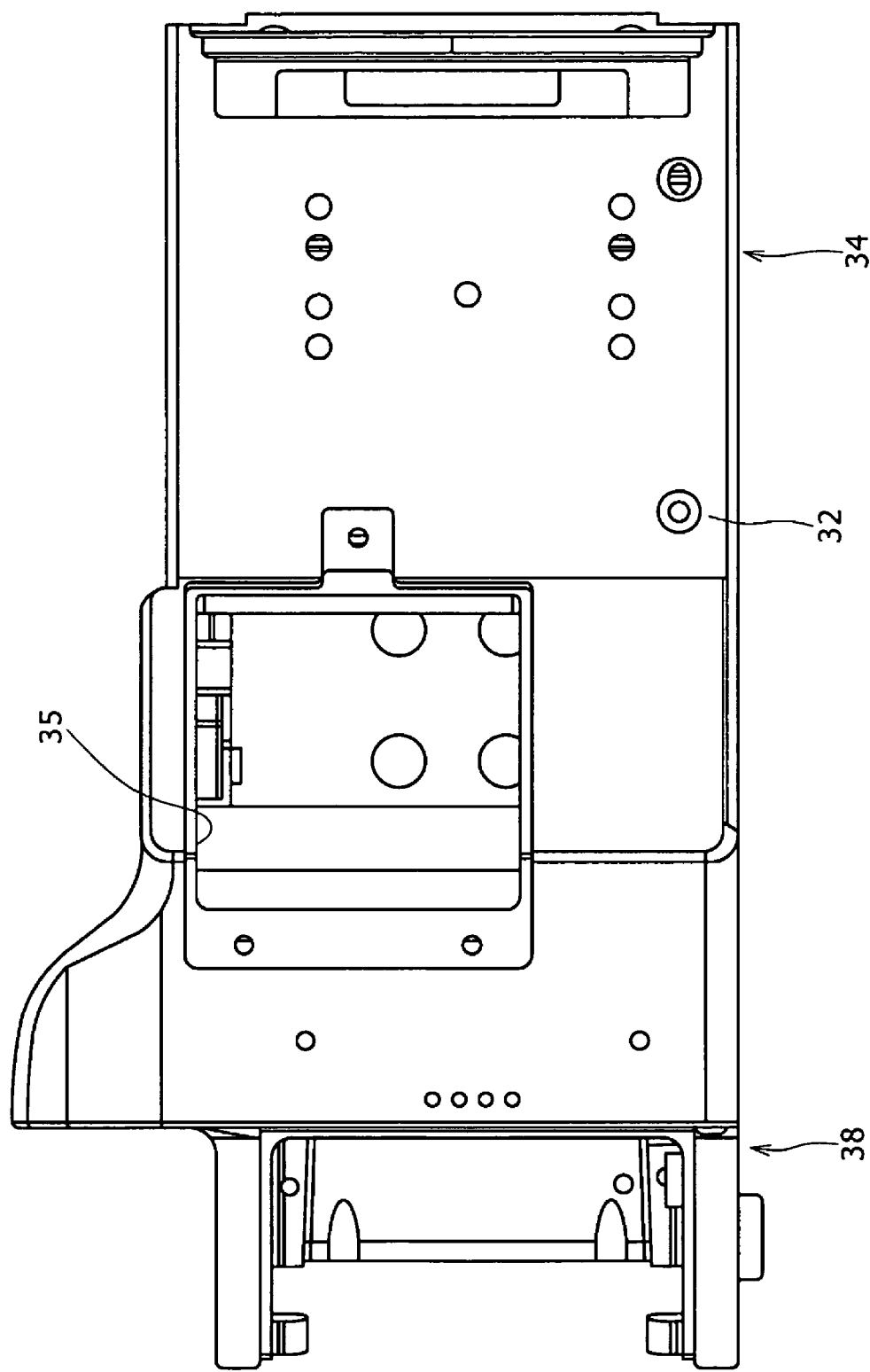
FIG. 29 is a view taken in the direction of the arrow B in FIG. 27.
Figure 30:
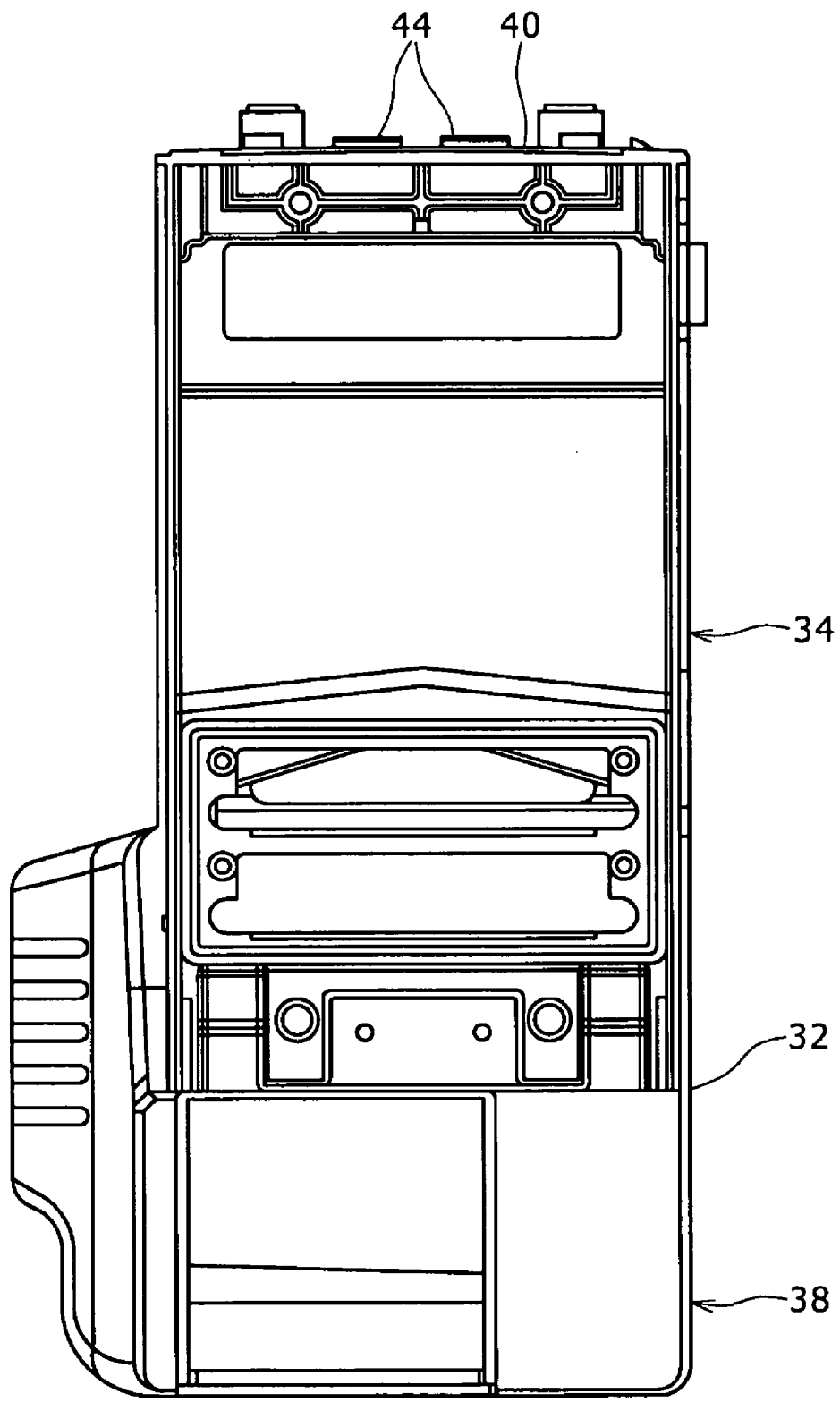
FIG. 30 is a view taken in the direction of the arrow C in FIG. 27.
Figure 31:
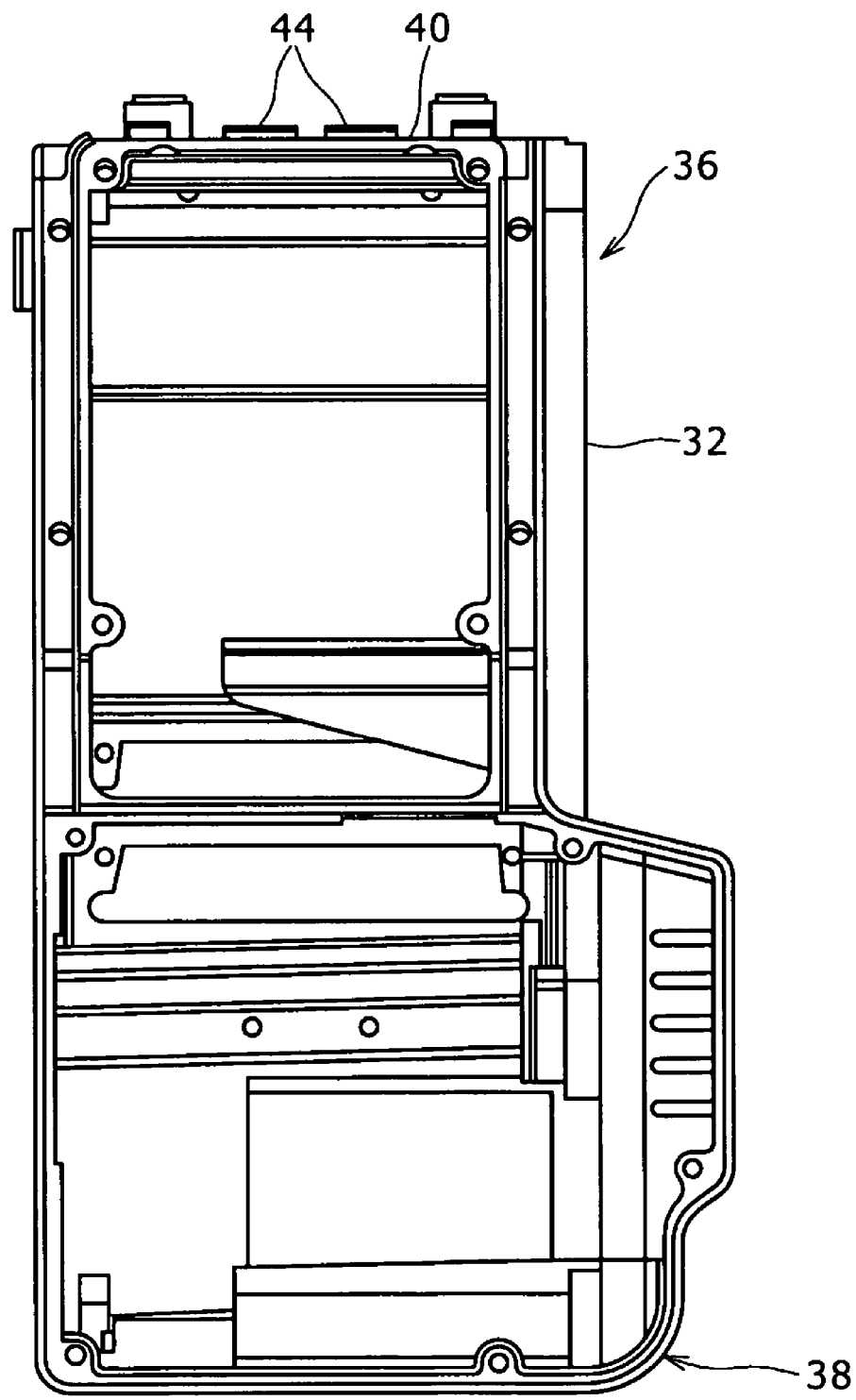
FIG. 31 is a view taken in the direction of the arrow D in FIG. 27.

Referring to FIGS. 27, 28 and 35, a plurality of vent holes 42 are formed in a middle part, with respect to lateral directions, of the upper wall 40 so as to open into the front part 34 and the back part 36. Heat is dissipated through the vent holes 42.

The vent holes 42 have a circular cross section. Standing cylindrical walls 44 are formed on the upper wall 40 so as to surround the vent holes 42, respectively.

As shown in FIGS. 27 and 28, a plurality of bosses 46 are formed in the upper wall 40. Accessories including a view finder are attached to the bosses 46. Threaded holes 4602 are formed in the upper surfaces of the bosses 46.

Four cover support bosses 48 provided with threaded holes 4802 in their upper surfaces are formed in the four corners of the upper wall 40.

Referring to FIGS. 35 to 38, the cover 50 has a rectangular main wall 52 covering the upper wall 40 provided with the vent holes 42, and side walls 45 extending at an angle to the main wall 52 from the four sides of the main wall 52. The height of the front side wall 54 is greater than those of the other side walls 54.

The inner surface of the main wall 52 facing the upper wall 40 and the space S is the inner surface 5002 of the cover 50. The cover 50 has an outer surface 5004 opposite the inner surface 5002. The distance between the inner surface 5002 and the outer surface 5004 is the thickness of the main wall 52.

Ventilation passages 56 are formed through portions, not corresponding to the vent holes 42, of the main wall 52. The ventilation passages 56 extend between the inner surface 5002 and the outer surface 5004.

Figure 37C:
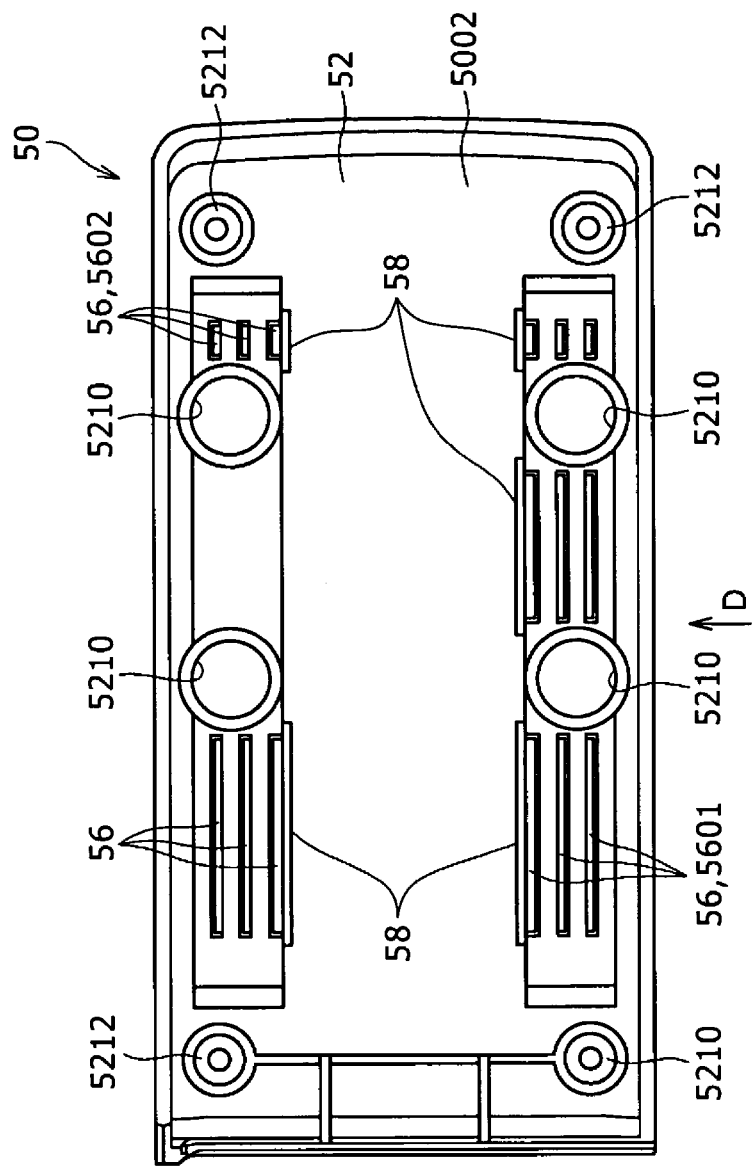
FIG. 37(C) is a plan view of the covering member taken in the direction of the arrow C in FIG. 36(B)

As shown in FIGS. 36(A) and 37(C), the ventilation passages 56 are longitudinal grooves 5601 formed in the main wall 52. The grooves 5601 are arranged laterally at intervals.

The ventilation passages 56 are the three longitudinal grooves 5601 extended near the right side of the main wall 52 on the right-hand side of the vent holes 42 and the three longitudinal grooves 5601 extended near the left side of the main wall 52 on the left-hand side of the vent holes 42.

The ventilation passages 56 are formed in a zigzag cross section as shown in FIG. 35 so that the upper wall 40 of the casing 30 and the space S extending under the inner surface 50 are not exposed outside the cover 50. Naturally, the ventilation passages 56 may be formed in a curved cross section so that the upper wall 40 of the casing 30 is not exposed outside the cover 50.

Each of the ventilation passages 56 has an upper section 5602 extending from the outer surface 5004 toward the inner surface 5002 of the cover 50, a lateral section 5604 laterally extending from the lower end of the upper section 5602 in a direction perpendicular to the thickness of the main wall 52, and a lower section 5606 extending downward from the lateral portion 5604 and opening in the inner surface 5002. Thus a space on the inner side of the inner surface 5002 communicates with a space on the outer side of the outer surface 5004 by means of the ventilation passages 56.

Referring to FIGS. 35 and 37(C), water drop stopping ribs 58 are formed at positions each between the vent holes 42 and the ventilation passages 56 on the inner surface 5002 of the main wall 52.

Each of the water drop stopping ribs 58 is formed along the open end, opening in the inner surface 5002 of the main wall 52, of each of the grooves 5601 nearest to the vent holes 42 among the plurality of grooves formed near the right and the left side part of the main wall 52 on the side of the vent holes 42 relative to the groove 5601. The water drop stopping ribs 58 extend from the inner surface 5002 of the main wall 52 toward the upper wall 40.

As shown in FIGS. 36(A) and 37(C), the main wall 52 is provided with a plurality of circular openings 5210. When the upper wall 40 is covered with the cover 50, the bosses 48 of the upper wall 40 coincide with the openings 5210, respectively.

Figure 26:
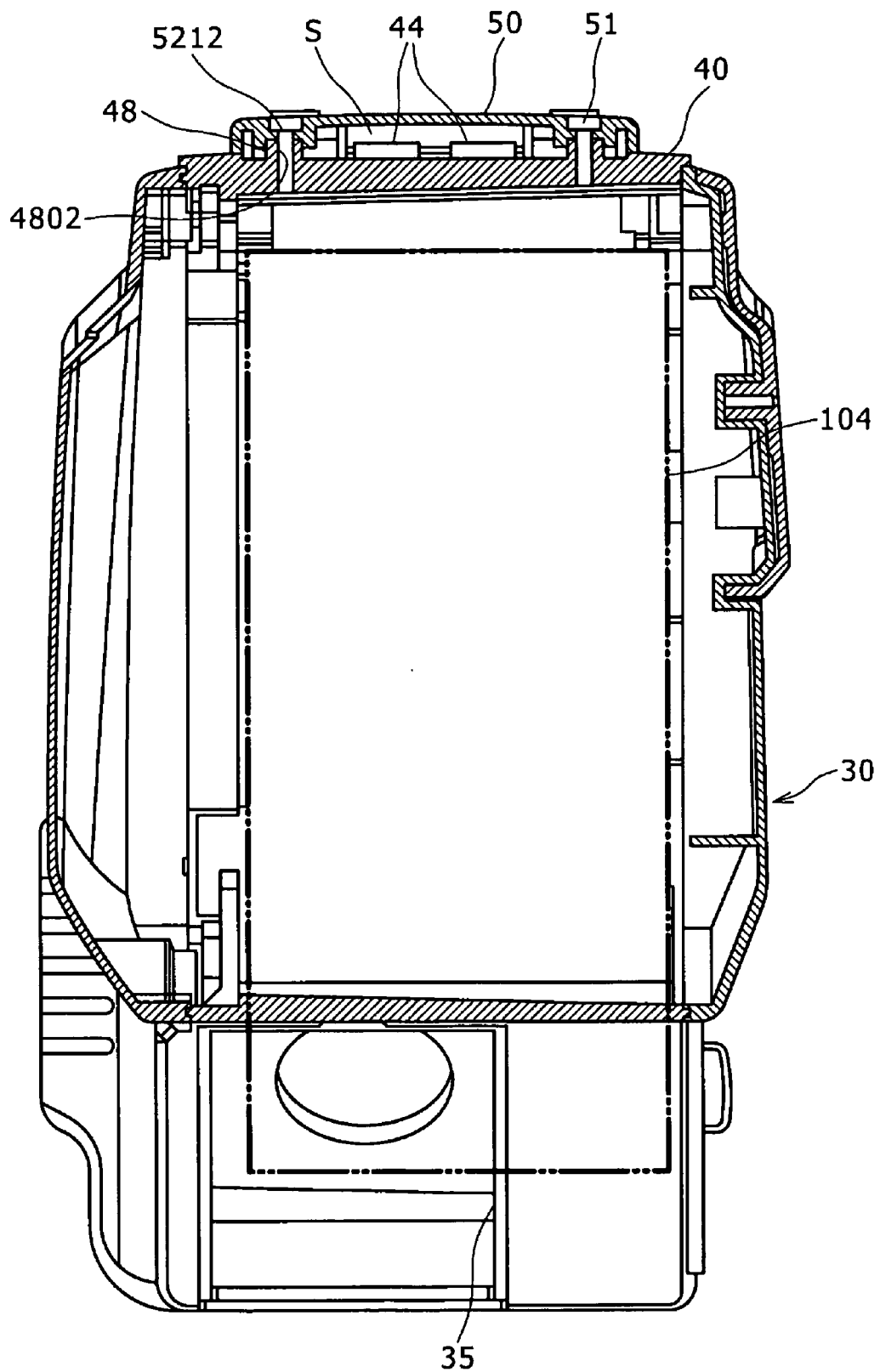
FIG. 26 is a sectional view taken on the line X-X in FIG. 24.

As shown in FIGS. 26 and 36(A), the main wall 52 is provided on its inner surface 5002 with bosses 5212 so as to coincide with the bosses 48 when the upper wall 40 is covered with the cover 50. Bolts 51 passed through those bosses 5212 are screwed in the threaded holes 4802 of the bosses 48.

Figure 37D:
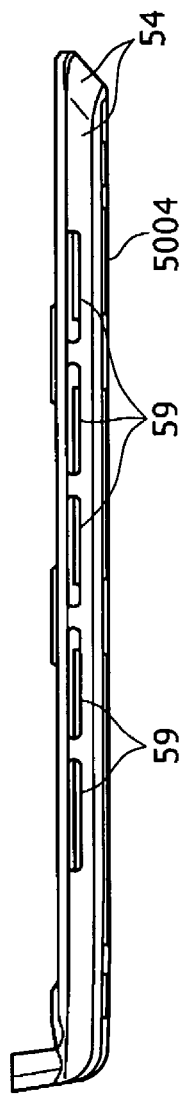
FIG. 37(D) is a side elevation of the covering member taken in the direction of the arrow D in FIG. 37(C)
Figure 38E:
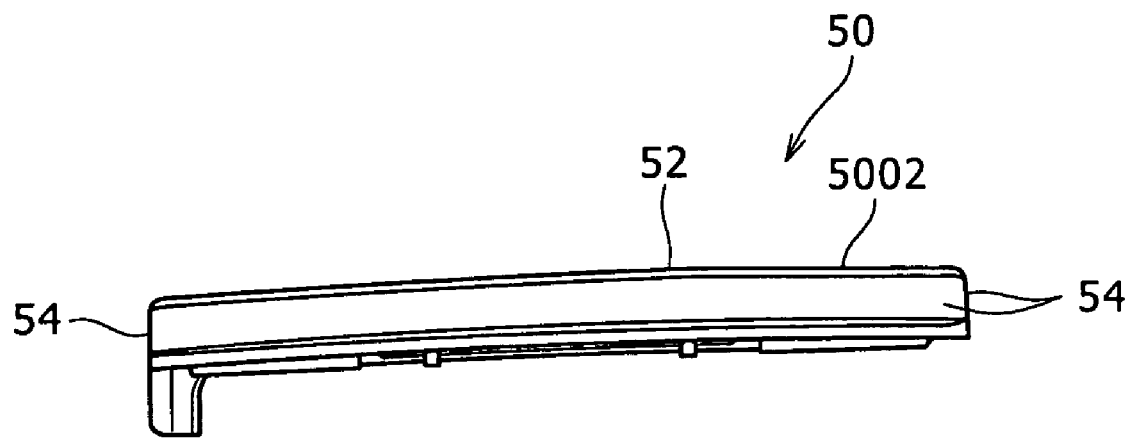
FIG. 38(E) is a side elevation of the covering member taken in the direction of the arrow E in FIG. 36(A)
Figure 38F:
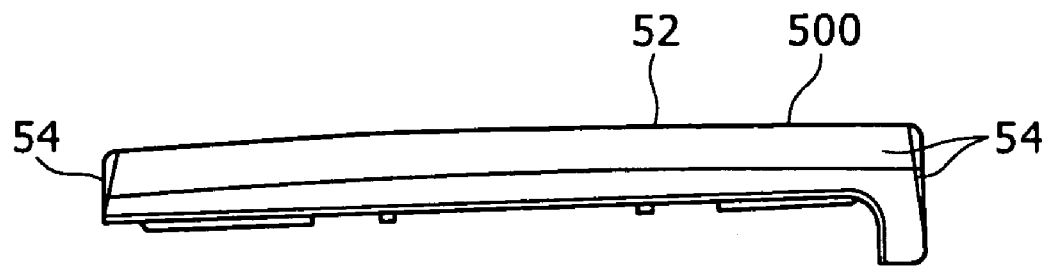
FIG. 38(F) is a side elevation of the covering member taken in the direction of the arrow F in FIG. 36(A)

As shown in FIGS. 36(B) and 37(D), a plurality of drain holes 59 are formed in the side walls 54. The drain holes 59 are arranged longitudinally at intervals. The side walls 54 may be provided with cuts instead of the drain holes 59.

Figure 32:
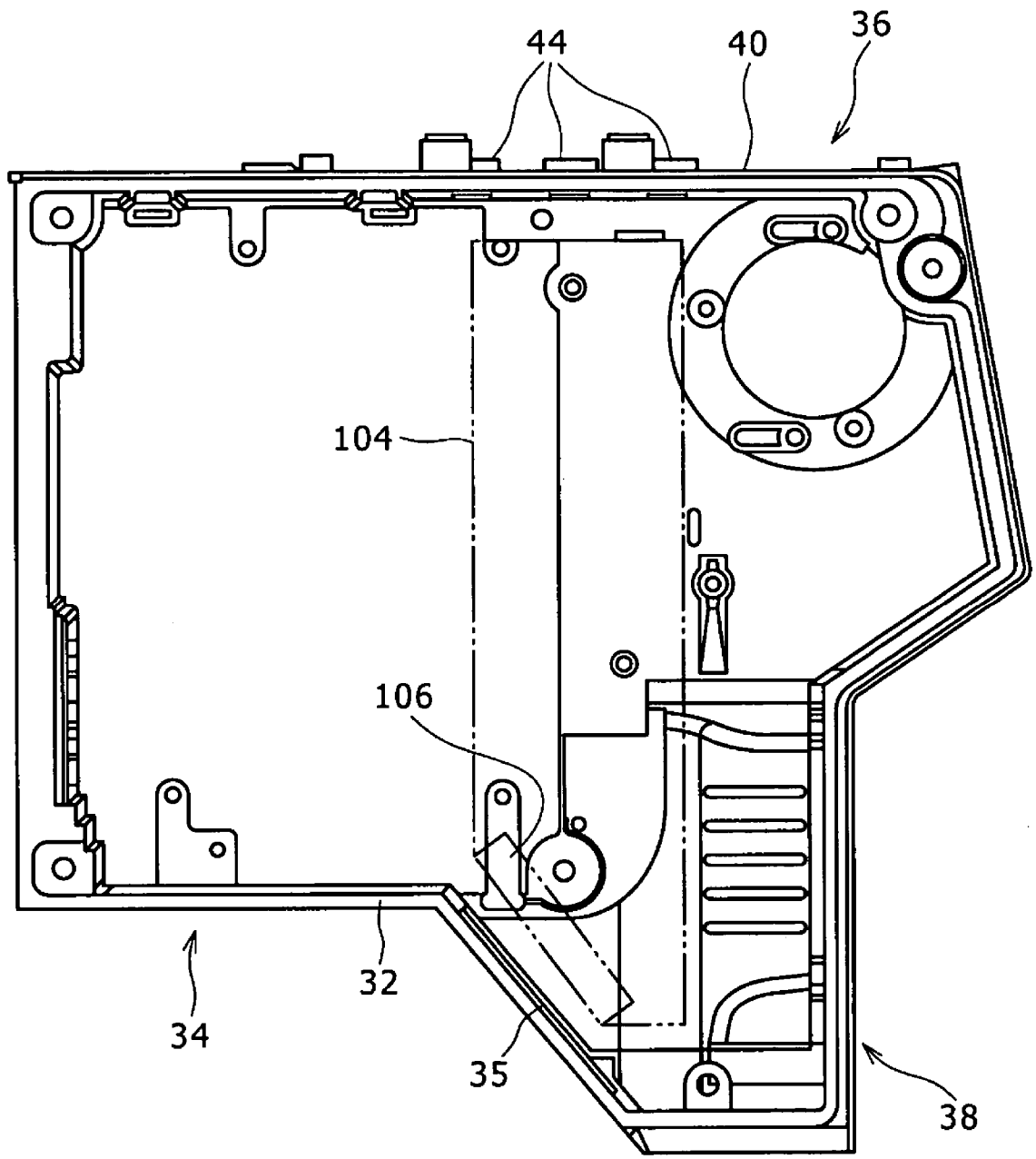
FIG. 32 is a view taken in the direction of the arrow E in FIG. 27.
Figure 33:
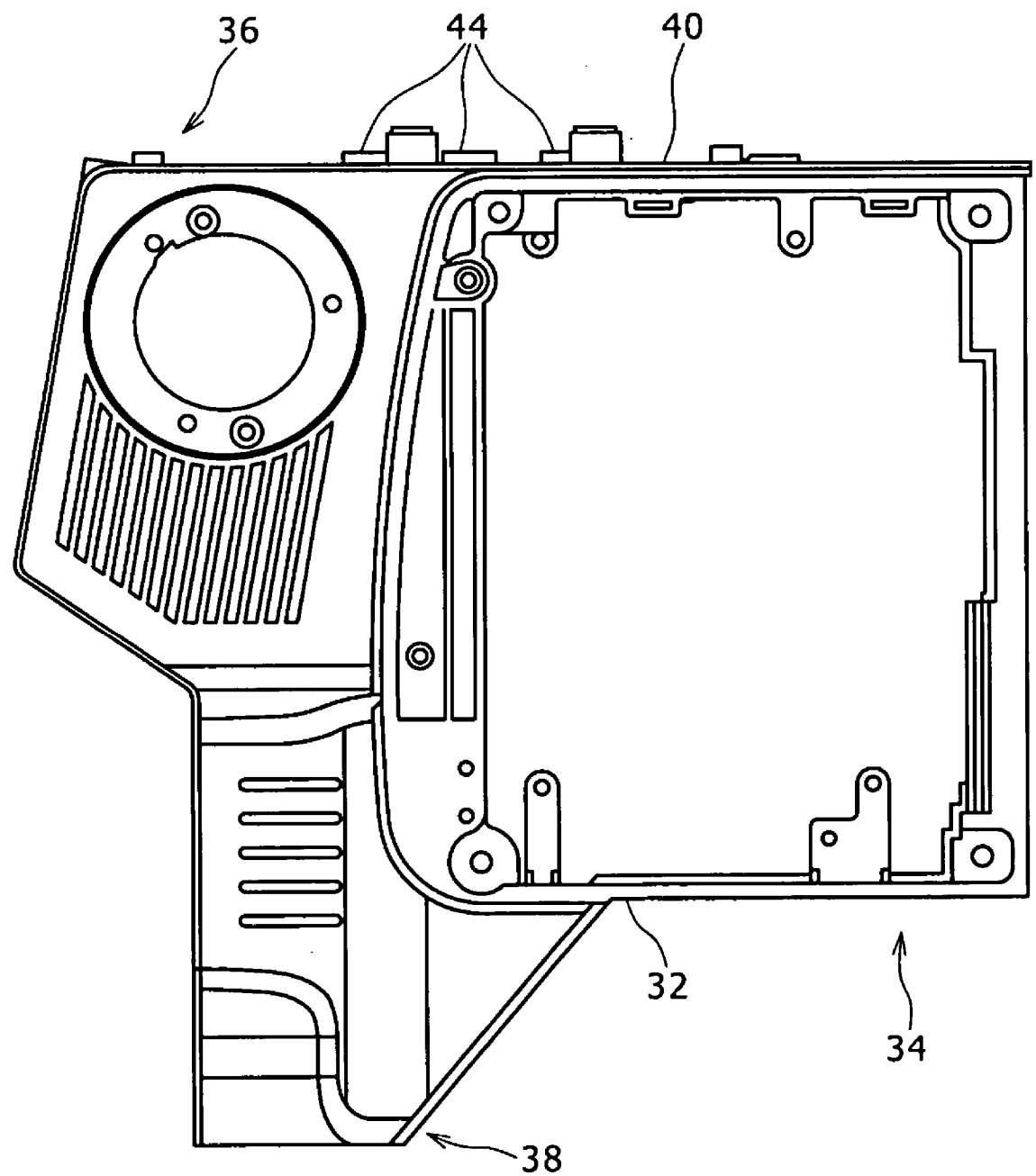
FIG. 33 is a view taken in the direction of the arrow F in FIG. 27.
Figure 34:
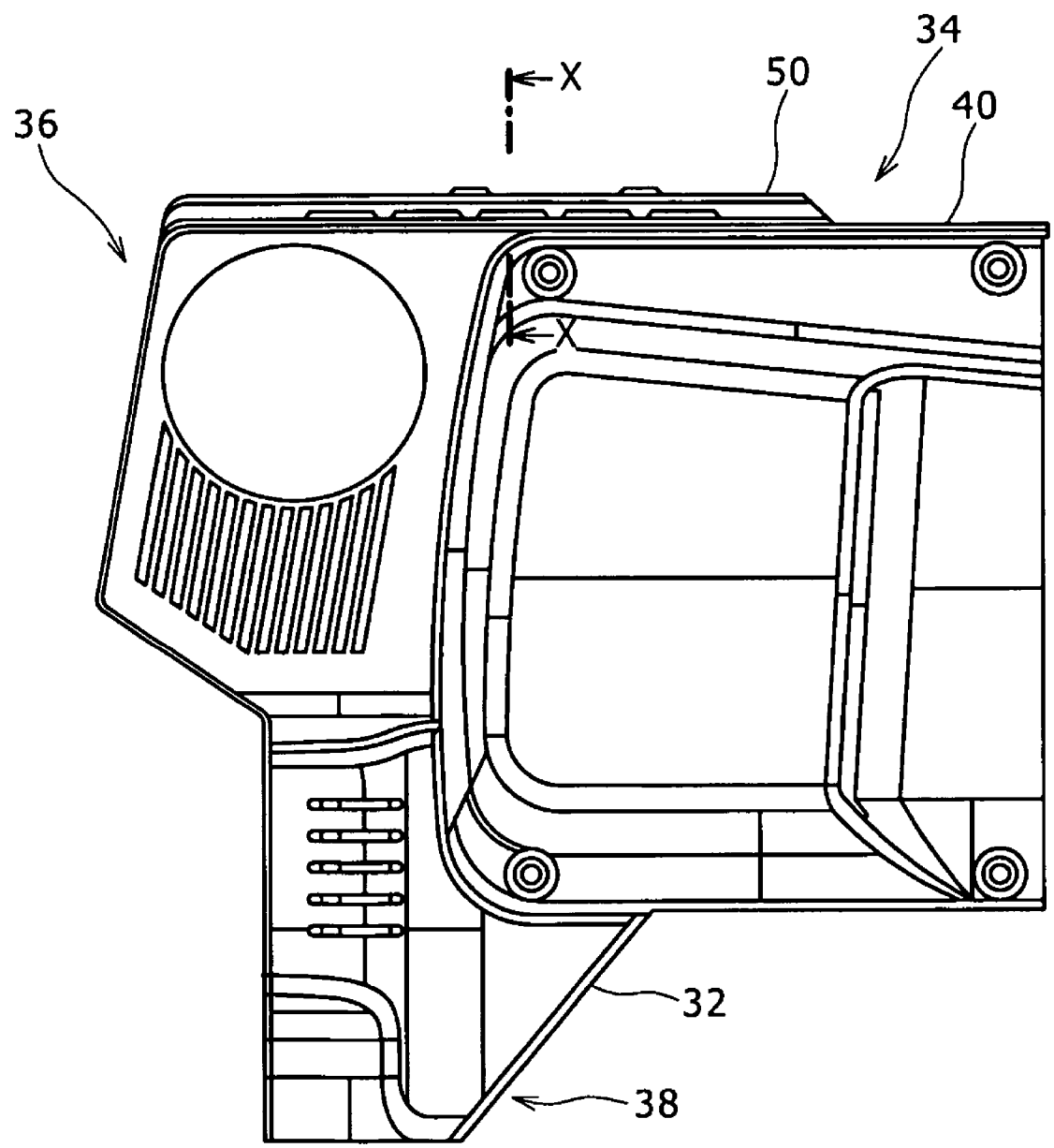
FIG. 34 is a side elevation, of the imaging operation controller, showing the left side of the imaging operation controller.

In FIG. 32, indicated at 104 is a power supply included in the electric system and at 106 is an exhaust fan.

The power supply 104 supplies power necessary for operating the imaging operation controller 20. The power supply 104 is a component that generates the largest amount of heat among the components of the electric system.

The exhaust fan 106 is driven when temperature in the casing 30 rises. When the exhaust fan 106 operates, the outside air is taken through the ventilation passages 56, the space S and the plurality of vent holes 42 into the casing 30. The outside air flows through spaces around electric devices of the electric system including the power supply 104 to cool the electric devices. The outside air used to cool the electric devices is discharged outside from the casing 30 through a discharge opening 35.

Noise generated by the exhaust fan 106 can be propagated through the ventilation passages 56, the space S and the vent holes 42 and upward from the casing 30 by taking outside air through the ventilation passages 56, the space Sand the vent holes 42 into the casing 30 by the exhaust fan 106. Consequently, the user holding the imaging operation controller 20 on the shoulder and using the imaging operation controller 20 will not be bothered by the noise generated by the exhaust fan 106.

As shown in FIGS. 24 and 26, the cover 50 is fastened to the upper wall 40 by screwing the bolts 51 passed through the bosses 5212 in the threaded holes 4802 of the bosses 48.

As shown in FIG. 35, the ventilation passages 56 are formed through portions, not corresponding to the vent holes 42, of the main wall 52. The ventilation passages 56 are formed in a zigzag cross section so that the upper wall 40 of the casing 30 and the space S extending under the inner surface 50 are not exposed outside the cover 50.

When water drops fall on the outer surface of the cover 50 provided by the ventilation passages 56 attached to the casing provided with the vent holes 42 while the imaging operation controller 20 is used in a rainy weather or the like, water drops fall on the side surfaces of the bent ventilation passages 56 and drip onto the upper wall 40. Water collected on the upper wall 40 is drained outside the cover 50 through the drain openings 59 formed in the cover 50.

Since the water drips slowly onto the upper wall 40, the water will not splash and hence water droplets will not fall into the vent holes 42. Air continuously flowing outside through the ventilation passages 56 prevents surely the entrance of water into the casing 30 and is effective in efficiently dissipating heat generated in the casing 30.

The entrance of water droplets dropped on the upper wall 40 into the vent holes 42 can be surely prevented by the water drop stopping ribs 58 formed at positions each between the vent holes 42 and the ventilation passages 56 on the inner surface 5002 of the main wall 52 so as to extend toward the upper wall 40.

The water drop stopping ribs 58 formed along the open ends of the ventilation passages 56 on the inner surface 4002 at positions near the vent holes 42 ensures the prevention of entrance of water droplets dropped onto the upper wall 40 into the vent holes 42.

A water absorbing member of a water absorptive material, such as sponge, may be placed in the space between the cover 50 and the upper wall 40 provided with the vent holes 42 to prevent the entrance of water droplets into the vent holes 42. The amount of water that can be absorbed by the water absorbing member is limited and the water absorbing member needs an additional cost. The imaging operation controller 20 of the foregoing construction does not need such a water absorbing member that increases the cost of the imaging operation controller 20.

Figure 39:
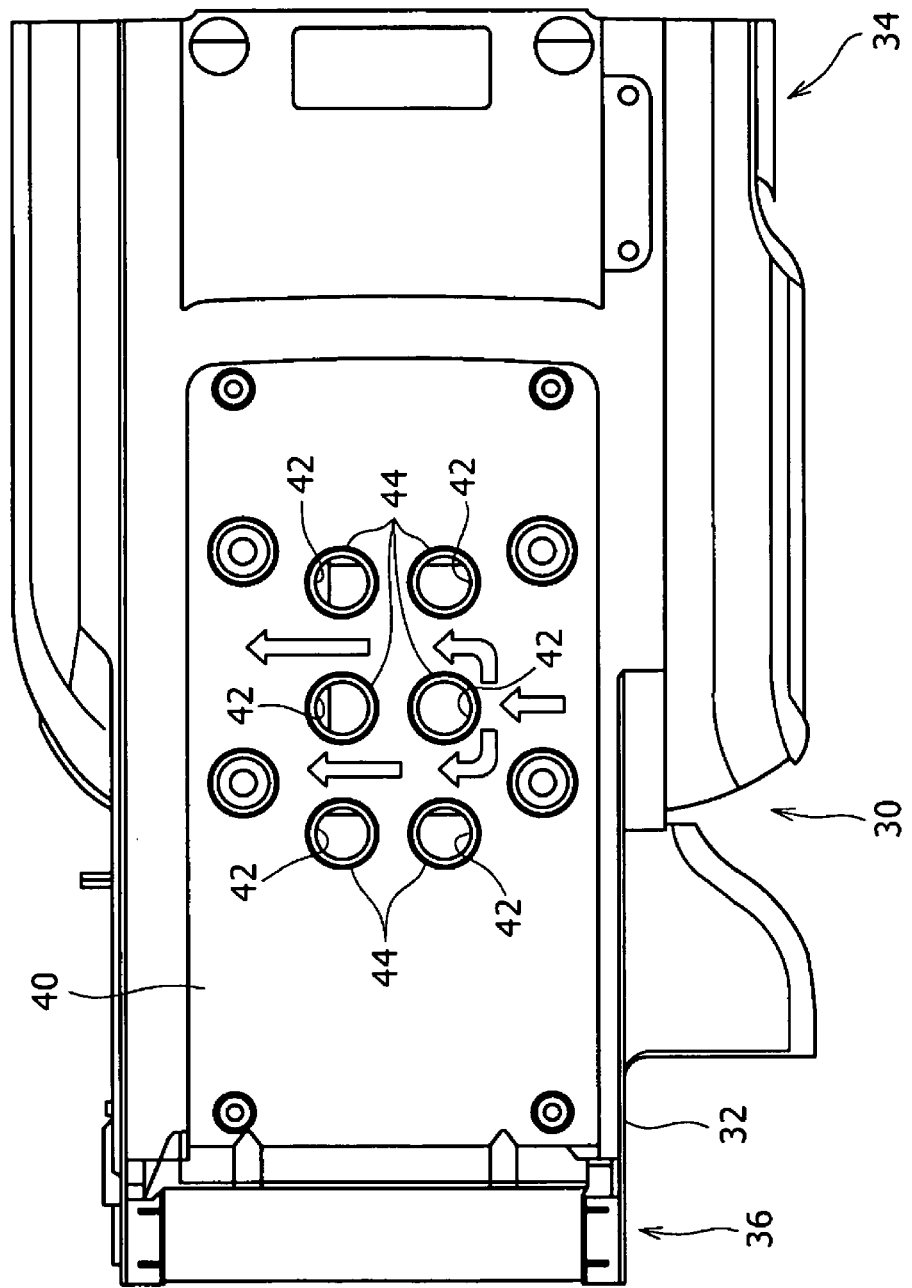
FIG. 39 is view of assistance in explaining the movement of water drops on the upper wall of the frame.

The vent holes 42 formed in the upper wall 40 are circular and are surrounded by the standing cylindrical walls 44 rising from the upper wall 40. Therefore, water collected on the upper surface of the upper wall 40 flows smoothly along the outer surfaces of the standing cylindrical walls 44 as indicated by the arrows in FIG. 39 and flows outside the cover 50 through the drain openings 59 when the casing 30 is tilted sideways. Thus the flow of water collected on the upper surface of the wall 40 over the standing cylindrical walls 44 into the vent holes 42 can be prevented.

If the upper wall 40 is provided with rectangular vent holes 42 and standing walls 44 having a rectangular cross section and surrounding the rectangular vent holes 44, water is liable to stagnate on the upper surface of the upper wall 40 and is likely to flow over the standing walls 44 into the vent holes 42 when the casing 30 is tilted sideways. The circular vent holes 42 and the standing cylindrical walls 44 of the present invention can surely prevent such a problem.

While the exhaust fan 106 is out of operation, air in the casing 30 heated by the power supply 104 flows upward in the casing 30 and flows smoothly outside the casing 30 through the vent holes 42, the space S and the ventilation passages 56.

While the exhaust fan 106 is in operation, outside air flows through the ventilation passages 56, the space S and the vent holes 42 into the casing 30. Since the ventilation passages 56 are formed in a zigzag cross section so as to conceal the upper wall 40 of the casing 30 from view from outside the cover 50 and the water drop stopping ribs 58 are formed at positions between the vent holes 42 and the ventilation passages 56, the entrance of water drops into the vent holes 42 can be surely prevented.

Ventilation passages 56 in modifications will be described with reference to FIG. 40.

FIGS. 40(A) and 40(B) are cross sectional views of the ventilation passages 56 in a first and a second modification, respectively.

The main wall 52 provided with the ventilation passage 56 in the first modification has a thin, longitudinal bottom wall 5612. A longitudinal strip 5614 is extended above the bottom wall 5612. A longitudinal groove 5616 is formed so as to extend on the opposite sides of the strip 5614.

As shown in a cross-sectional view, the ventilation passage 56 has upper sections 5602 extending from the outer surface 5004 toward the inner surface 5002 of the cover 50 on the right and the left side of the strip 5614, a lateral section 5604 extending from the lower end of the upper sections 5602 in a direction perpendicular to the thickness of the main wall 52 under the strip 5614, and a lower section 5606 (5616) extending down ward from the lower end of the lateral section 5604 and opening in the inner surface 5002.

The main wall 52 provided with the ventilation passage 56 in the second modification has a thin, longitudinal bottom wall 5612. A longitudinal strip 5614 is extended above the bottom wall 5612. A longitudinal groove 5616 is formed in the bottom wall 5612 under the strip 5614.

The strip 5614 is provided with a longitudinal reinforcing rib 5620 in a middle part with respect to a lateral direction of its lower surface. The reinforcing rib 5620 extends into the groove 5616.

As shown in a cross-sectional view in FIG. 40(B), the ventilation passage 56 has an upper section 5620 extending from the outer surface 5004 toward the inner surface 5002 of the cover 50 on the opposite sides of the strip 5614, a lateral section 5604 extending from the lower end of the upper section 5602 in a direction perpendicular to the thickness of the main wall 52, and a lower section 5606 extending from the lower end of the lateral section 5604 toward the inner surface 5002 and opening in the inner surface 5002 on the right and the left side of the reinforcing rib 5620.

The effects of the ventilation passages 56 in the first and the second modification are the same as that of the foregoing ventilation passage 56.

A standing wall 44 in a modification of the standing cylindrical wall 44 will be described with reference to FIG. 41.

FIG. 41 is a sectional view of a portion, including a vent hole 42 and a standing wall 44, of an upper wall 40.

The standing wall 44 in this modification is a cylindrical wall rising from the upper wall 40 so as to surround the vent hole 42. The standing wall 44 is provided with a circular flange 4420 extending radially outward from the upper end thereof.

The effect of the standing wall 44 in this modification is the same as those of the foregoing standing walls 44. The flange 4420 of the standing wall 44 enhances the effect of the standing wall 44 in preventing the flow of water collected on the upper surface of the upper wall 40 over the standing wall 44 into the vent hole 42.

An upper wall 40 in a modification of the foregoing upper wall 40 will be described.

FIG. 42 is a sectional view of the upper wall 40 in the modification having an upper surface different from that of the foregoing upper wall 40.

As shown in FIG. 42, the upper wall 40 is provided with small protrusions 4020 in the upper surface thereof.

The curved surfaces of the small protrusions 4020 attenuate the power of water drops fallen through the ventilation passages 56 onto the upper surface of the upper wall 40 and thereby the entrance of the water drops fallen on the upper wall 40 into the vent holes 42 can be prevented.

Third Embodiment

An imaging operation controller in a third embodiment according to the present invention will be described in comparison with a known imaging operation controller.

A camera, particularly, a business camera formed by uniting together a camera unit and a VTR unit, has a casing provided with ventilation passages through which air heated by a power circuit held in the casing is discharged outside.

When the camera is used on a rainy day or in an environment where the camera is likely to be splashed with water drops, such as a place near a swimming pool, it is likely that water drops enter the casing through the ventilation passages and cause electric parts to malfunction.

A previously proposed camera designed to avoid such a trouble has a casing provided with ventilation passages and covers made of a shape memory alloy and covering the ventilation passages. When the temperature in the casing rises, the covers curve so as to open the ventilation passages to discharge hot air heated in the casing through the ventilation passages. When the temperature in the casing does not rise significantly while the camera is used in an environment of a comparatively low temperature on a rainy day or the like, the covers keep covering the ventilation passages to prevent the entrance of water drops into the casing.

A recently proposed camera has a camera unit that generates image signals representing an object, and an imaging operation controller for converting the image signals into video signals and supplying the video signals to an external device. The camera unit and the imaging operation controller are fabricated separately and are detachably connected for use.

A space in the casing of the imaging operation controller formed separately from the camera unit is inevitably narrow and hence the space is likely to be heated at a high temperature. The recent high-performance, high-functional imaging operation controller to deal with the high-definition television system that produces pictures of a high picture quality needs a power supply of an increased capacity to supply power to many accessories. Consequently, electric devices held in the casing of the imaging operation controller generates generate a large amount of heat.

Temperature in the casing of such an imaging operation controller rises inevitably even while the imaging operation controller is used in an environment of a comparatively low temperature, such as an environment on a rainy day. Therefore, the ventilation passages of the casing are opened if the ventilation passages are covered with the foregoing covers made of a shape memory alloy and water drops are likely to enter the casing.

The imaging operation controller in the third embodiment is intended to cope with the foregoing problems. The imaging operation controller in the third embodiment has a drip-proof casing capable of surely preventing water drops from entering therein and of efficiently discharging hot air heated therein outside.

If water drops fall on the covers of the imaging operation controller in the third embodiment while the imaging operation controller is being used in a wet environment, such as an outdoor space on a rainy day, the power of the water drops is attenuated by bent ventilation passages and thereby the entrance of the water drops into vent holes can be prevented.

In the third embodiment, circular vent holes are surrounded by standing cylindrical walls. Water collected on the upper surface of the upper wall of the casing flows smoothly along the outer surfaces of the standing cylindrical walls and flows outside a cover through drain openings when the casing is tilted sideways. Thus the flow of water collected on the upper surface of the wall over the standing cylindrical walls into the vent holes can be prevented.

The drip-proof covers make water drops fallen on the drip-proof covers strike against the bent or curved surfaces of the ventilation passages and the power of the water drops is attenuated by the bent or curved ventilation passages and thereby the entrance of the water drops into vent holes can be prevented.

A capping member included in the imaging operation controller in the third embodiment will be described with reference to FIGS. 10 to 14.

Figure 10:
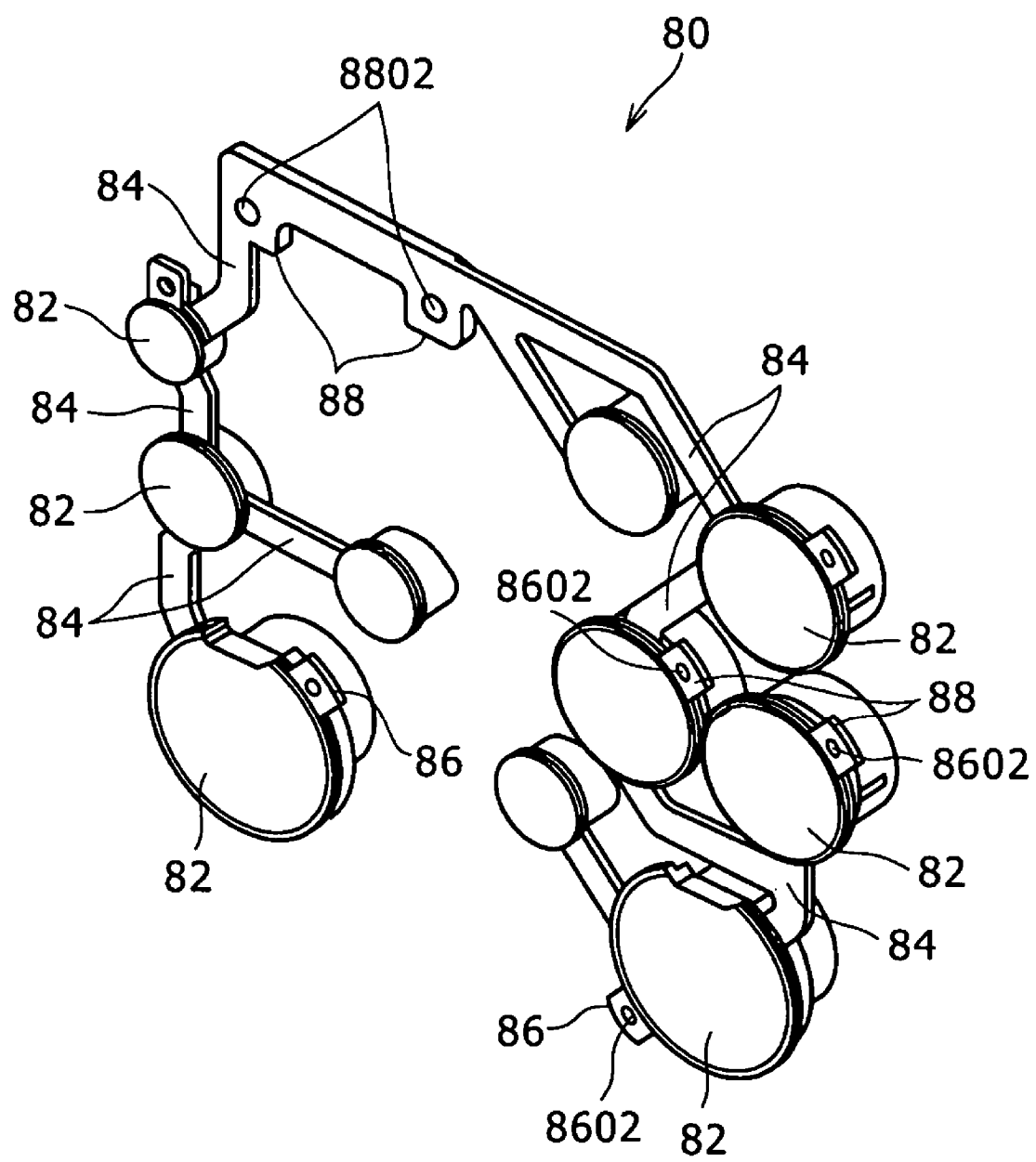
FIG. 10 is a perspective view of a cap included in an imaging operation controller embodying the present invention.
Figure 11A:
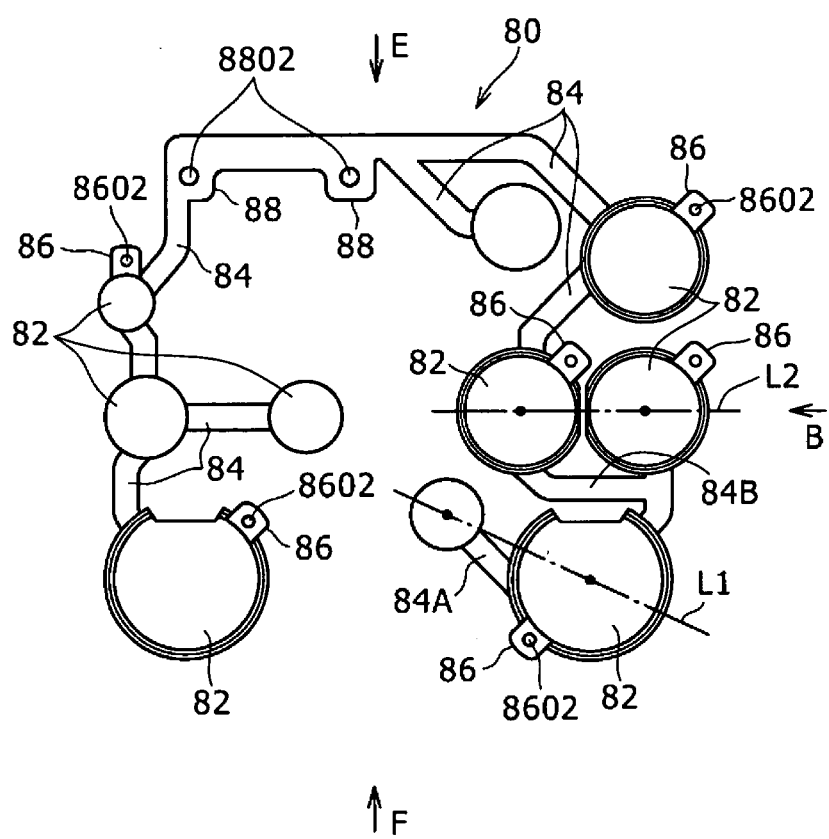
FIG. 11(A) is a plan view of the cap shown in FIG. 10.
Figure 11B:
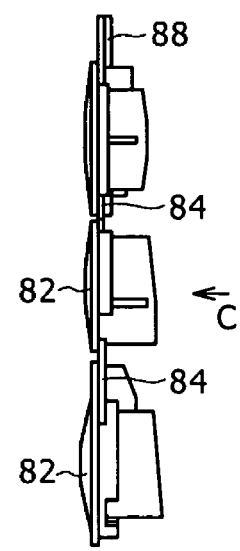
FIG. 11(B) is a side elevation of the cap taken in the direction of the arrow B in FIG. 11(A)
Figure 12C:
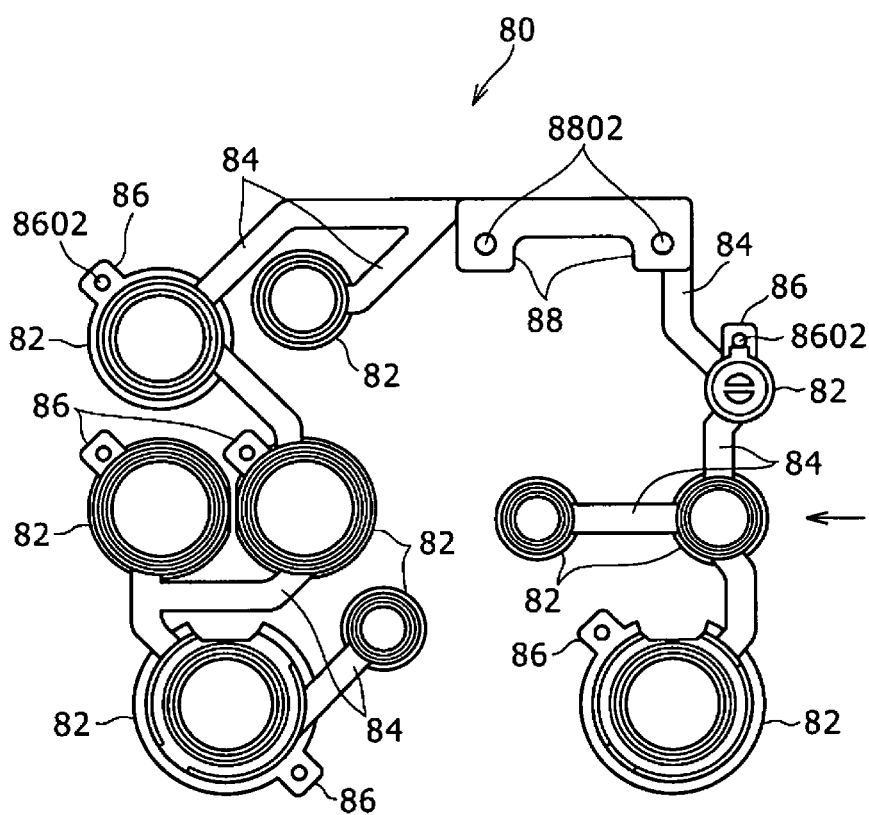
FIG. 12(C) is a plan view of the cap taken in the direction of the arrow C in FIG. 11(B)
Figure 12D:
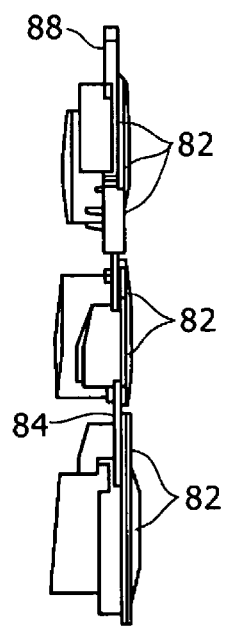
FIG. 12(D) is a side elevation of the cap taken in the direction of the arrow D in FIG. 12(C)
Figure 13E:
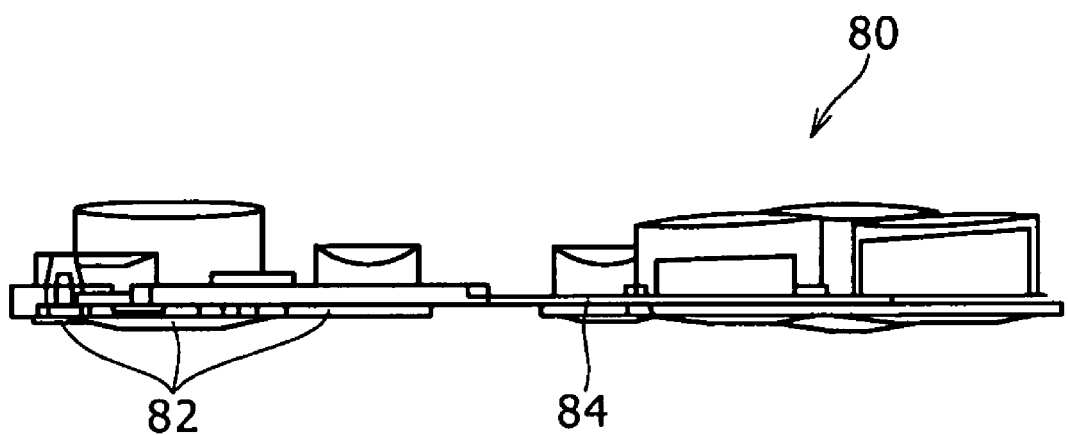
FIG. 13(E) is a side elevation of the cap taken in the direction of the arrow E in FIG. 10(A)
Figure 13F:
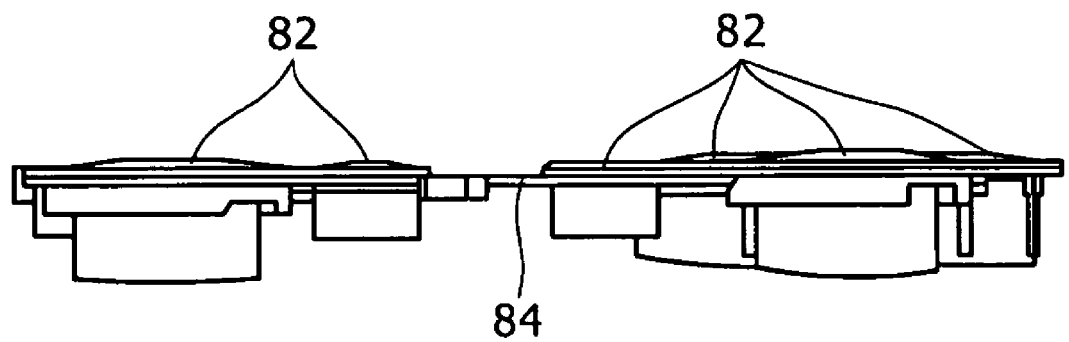
FIG. 13(F) is a side elevation of the cap taken in the direction of the arrow F in FIG. 10(A)

FIG. 10 is a perspective view of the capping member, FIG. 11(A) is a plan view of the capping member, FIG. 11(B) is a side elevation of the capping member taken in the direction of the arrow B in FIG. 11(A), FIG. 12(C) is a top view of the capping member taken in the direction of the arrow C in FIG. 11(B), FIG. 12(D) is a side elevation of the capping member taken in the direction of the arrow D in FIG. 12(C), FIG. 13(E) is a side elevation of the capping member taken in the direction of the arrow E in FIG. 11(A) and FIG. 13(F) is a side elevation of the capping member taken in the direction of the arrow F in FIG. 11(A).

Figure 14:
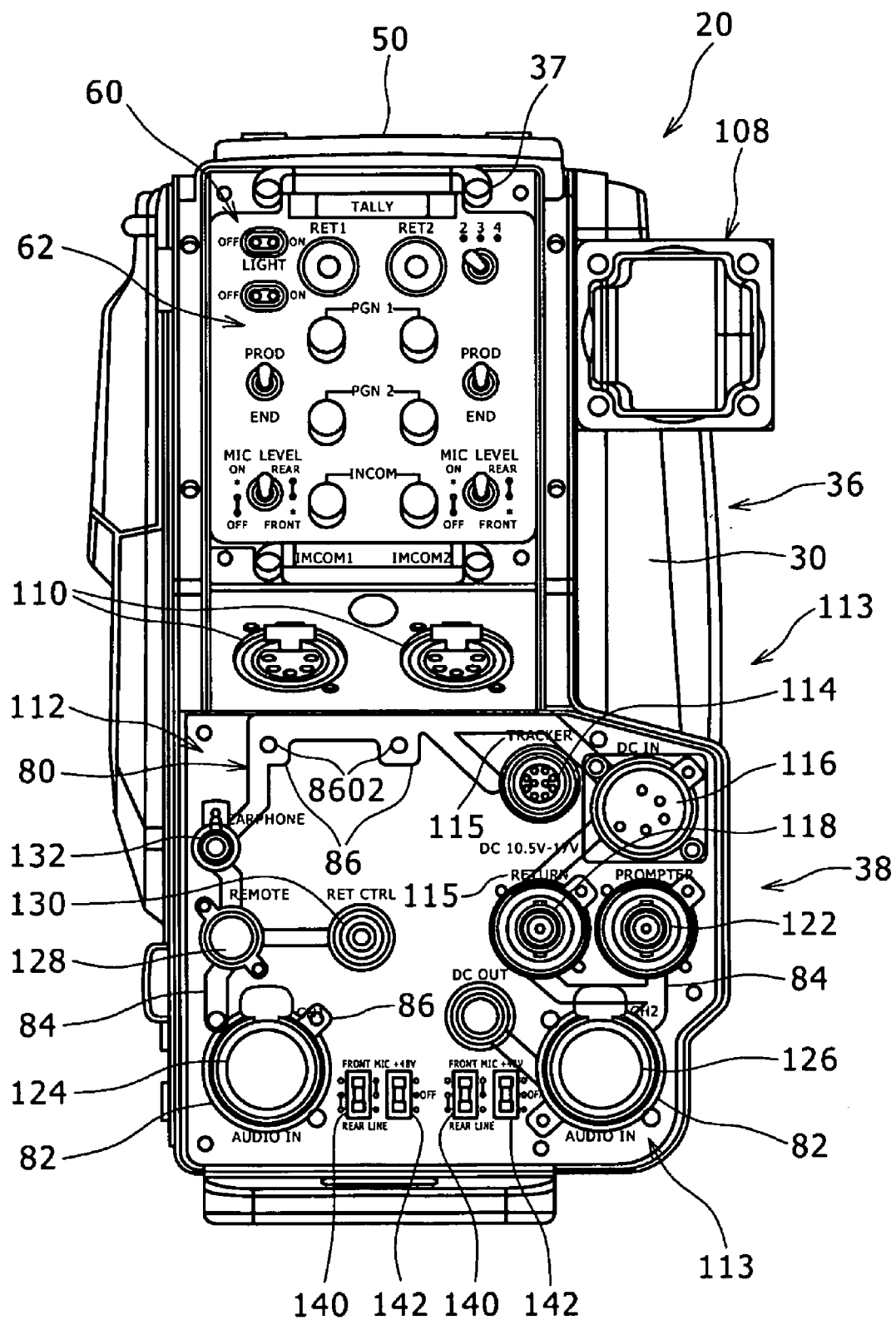
FIG. 14 is a plan view of assistance in explaining the cap put in place.

FIG. 14 is a rear view of the imaging operation controller provided with the capping member.

A connector panel 112 will be described with reference to FIG. 22.

The connector panel 112 is provided with a plurality of connectors 113. The connectors 113 include a tracker connector 114 for telephone conversation between the user of the business camera 100, namely, a cameraman, and trackers and for signal exchange between the user and an intercommunication system, a DCIN connector 116 for receiving dc power from an ac adapter or a battery, a RETURN connector for sending out return video signals, a PROMPTER connector 120 for sending out prompter video signals to and receiving prompter video signals from a prompter that displays characters and such, a DCOUTPUT connector 122 for supplying dc power to external devices (accessories), an AUDIOIN CH1 connector 124 for receiving acoustic signals from an external device, an AUDIOIN CH2 connector for receiving audio signals from an external device, a REMOTE connector 128 for connecting the imaging operation controller 20 to a remote control panel or a remote control unit, a RETCTRL connector 130 for receiving return video signal selecting signals and control signals for turning on and off an intercommunication microphone, and an EARPHONE jack 132 into which an earphone plug is inserted to enable selectively monitoring speeches transmitted by the intercommunication system and program speeches.

A function indicator 115 of characters "TRACKER" indicating the function of the TRACTER connector 114 is marked at a position near the TRACKER connector 114 on the connector panel 112. A function indicator 115 of characters "RETURN" indicating the function of the RETURN connector 118 is marked at a position near the RETURN connector 118 on the connector panel 112.

Similarly function indicators 115 indicating the functions of the connectors 113 are marked at positions near the connectors 113, respectively, on the connector panel 112.

Shown also in FIG. 22 are an audio signal selector switch 140 for selecting audio signals to be received by the AUDIOIN CH1 connector 124 and the AUDIOIN CH2 connector 126. The audio signal selector switch 140 has three positions, namely, FRONT, REAR and LINE positions. When the audio signal selector switch 140 is set to the FRONT position, audio signals representing sounds picked up by the camera are selected. When the audio signal selector switch 140 is set to the REAR position, signals received through the AUDIOIN CH1 connector 124 and the AUDIOIN CH2 connector 126 are given to the camera control unit. When the audio signal selector switch 140 is set to the LINE position, the respective levels of signals received through the AUDIOIN CH1 connector 124 and the AUDIOIN CH2 connector 126 are adjusted to a predetermined level.

Indicated at 142 in FIG. 22 is a microphone power supply mode selector switch for selecting either of a power supply mode for supplying power through the AUDIOIN CH1 connector 124 and the AUDIOIN CH2 connector 126 and a power stop mode for stopping supplying power through the AUDIOIN CH1 connector 124 and the AUDIOIN CH2 connector 126.

Referring to FIG. 14, a capping member 80 caps the plurality of connectors 113.

As shown in FIGS. 10 to 14, the capping member 80 is provided with a plurality of caps 82 to cap the plurality of connectors 113, respectively, and a plurality of flexible connecting bars 84 interconnecting the plurality of caps 82.

The connecting bars 84 connect all the caps 82 that cap the plurality of connectors 113.

The connecting bars 84 are made of a transparent material so that the function indicators 115 can be visually recognized in a state where the capping member 80 is attached to the connector panel 112. In this embodiment, the caps 82 and the connecting bars 84 are made integrally of an elastomer.

The connecting bars 84 are formed in lengths such that a desired one of the caps 82 can be put on and off the corresponding connector 113.

For example, if the adjacent connectors 113 are spaced a short distance apart from each other, the connecting bar 84A is deflected from a line L1 connecting the respective centers of the two caps 82 connected by the connecting bar 84A as shown in FIG. 11(A). The connecting bar 84A is deflected from a line L1 connecting the respective e centers of the two caps 82 connected by the connecting bar 84A as shown in FIG. 11(A). Thus the connecting bar 84A can be formed in a sufficiently long length.

For example, the connecting bar 84B is dislocated from a line L2 connecting the respective centers of the two caps 82 connected by the connecting bar 84B and is bent as shown in FIG. 11(A). Thus the connecting bar 84B can be formed in a sufficiently long length.

The caps 82 which are frequently put on and off the corresponding connectors 113 are provided with tabs 86, respectively. Each tab 86 is provided with a hole 8602 for connecting the cap 82 to the casing. The tab 86 facilitate handling the cap 82 which is frequently put on and off the connector 113. The cap 82 maybe cut off the connecting bar 84 and a string passed through the hole 8602 of the tab 86 of the cap 82 may be fastened to a proper part of the casing 30 (the connector panel 112). Then, the cap 82 can be easily put on and off the connector 113 and will not be lost.

The long connecting bar 84 is provided with attaching lugs 88 respectively provided with through holes 8802 (two through holes 8802 in this embodiment). Screws inserted through the through holes 8802 are screwed in threaded holes formed in the casing 30 (the connector panel 112) to fasten the lugs 88 of the connecting bar 84 to the casing 30. Thus parts of the capping member 80 are attached to the casing 30 to prevent the loss of the capping member 80.

The desired ones of the caps 82 of the capping member can be taken off the connectors 113, leaving the rest on the connectors 113.

Thus the caps 82 will not be lost regardless of the condition of use of the plurality of connectors 131 and the caps 82 capping the connectors 131 surely exercise their dust-proof and water-proof functions.

Since the caps 82 and the connecting bars 84 are formed integrally of a transparent elastomer, the function indicators 115 marked on the connector panel 112 can be visually recognized even if the function indicators 115 are covered with the connecting bars 84, which improves the handiness of the imaging operation controller 20.

Since the caps 82 and the connecting bars 84 are formed integrally of a transparent elastomer and the caps 82 are elastic, the caps 82, differing from those made of a synthetic resin, do not generate offensive noise when the caps 82 strike against the connectors 113, which further improves the handiness of the imaging operation controller 20.

A known capping member has a cap for detachably capping the connector 113 and a lug. The lug is fastened to the casing with a screw.

If all the connectors 113 are to be capped with the caps of capping members similar to such a known capping member, a fastening operation needs to be repeated by the number of times equal to the number of the caps, which requires troublesome work.

Another known capping member has a cap for detachably capping the connector 113, a ring to be put on a base part of a connector, and a strip connecting the cap and the ring. In most cases, the ring is held between the base part of the connector 113 and the connector panel 112.

Thus, the connector 113 needs to be removed from and attached to the connector panel 112 when the capping member is removed from and attached to the connector 113. Therefore, the replacement of the capping member, for example, requires very troublesome work.

In this embodiment, the connecting bars 84 can be attached to the casing 30 by fastening the lugs 88 of the capping member 80 to the casing 30 (connector panel 112) with the screws. Thus the capping member 80 can be attached to the casing 30 by simple attaching work.

The capping member 80 can be replaced without removing the connectors 113 from the connector panel 112 by simply unfastening the screws fastening the lugs 88 to the connector panel 112, which needs very simple work.

Although all the caps 82 for capping the plurality of connectors 113 are interconnected by the connecting bars 84 in this embodiment, it goes without saying that only some of the caps 82 may be interconnected by some of the connecting bars 84. When only some of the caps 82 are interconnected by the connecting bars 84, the connectors 113 may be capped with the caps 82 of a plurality of capping members 80.

Although the caps 82 and the connecting bars 84 are formed integrally of a transparent elastomer in this embodiment, either of the caps 82 and the connecting bars 84 or both the caps 82 and the connecting bars may be made of an opaque material. However, it is advantageous to make at least the connecting bars 84 of a transparent material to avoid making the function indicators 115 invisible by the connecting bars 84.

Although the capping member 80 is provided with the lugs 88 in this embodiment, the lugs 88 may be omitted because the caps 82 attached to the connectors 113 not in use prevent the loss of the capping member 80.

The caps 82 and the connecting bars 84 may be separately made and may be bonded together.

Either of the caps 82 and the connecting bars 84 or both the caps 82 and the connecting bars 84 may be made of a material other than the elastomer, such as a flexible synthetic resin when so desired.

Fourth Embodiment

An imaging operation controller 20 in a fourth embodiment according to the present invention will be described in comparison with a known imaging operation controller.

A camera, particularly, a business camera for use in a broadcasting station, includes a camera unit for generating image signals representing an image of an object and an imaging operation controller for converting image signals into corresponding video signals and sending the video signals to a camera control unit, namely, an external device. The camera unit and the imaging operation controller are detachably united together.

The imaging operation controller is provided with a plurality of connectors to which cables are connected electrically to exchange audio and video signals through the camera control unit with other imaging operation controllers.

The imaging operation controller is provided with caps for individually capping the connectors to isolate the connectors from dust and water. A previously proposed protective cover for preventing the loss of the caps is formed in a shape and size suitable for covering an area in which the connectors are arranged. The protective cover is attached to the imaging operation controller so as to be opened and closed.

A previously proposed known insulating protective cover includes a first insulating cover provided with a plurality of caps respectively for capping a plurality of output terminals, and a second insulating cover provided with a plurality of caps respectively for capping a plurality of input terminals. The first and the second insulating cover are connected so that the first and the second insulating cover can be turned relative to each other. When the caps of either of the first and the second insulating cover are removed from the corresponding terminals, the caps of the other insulating cover remain capping the corresponding terminals. Thus the loss of the insulating protective cover can be prevented.

When only some of the connectors covered by the known caps are used, all the connectors need to be uncovered and hence the connectors not in use cannot be protected from dust and water.

When only some of the terminals covered with the first or the second insulating cover are used, all the caps of the first or the second insulating cover need to be removed from all the terminals. Consequently, the terminals not in use cannot be protected from dust and water.

Thus the known protective means cannot fully exercise the dust-proof and water-proof functions in some modes of using the connectors.

The imaging operation controller in the fourth embodiment is provided with a capping member capable of surely exercising dust-proof and water-proof functions regardless of the state of use of connectors.

The capping member employed in the third embodiment has a plurality of caps and flexible connecting bars interconnecting the caps. Only the caps capping connectors to be used can be removed from the connectors and the rest of the caps can remain capping the rest of the connectors.

A cheek pad 90 included in the imaging operation controller in the fourth embodiment will be described.

Figure 1:
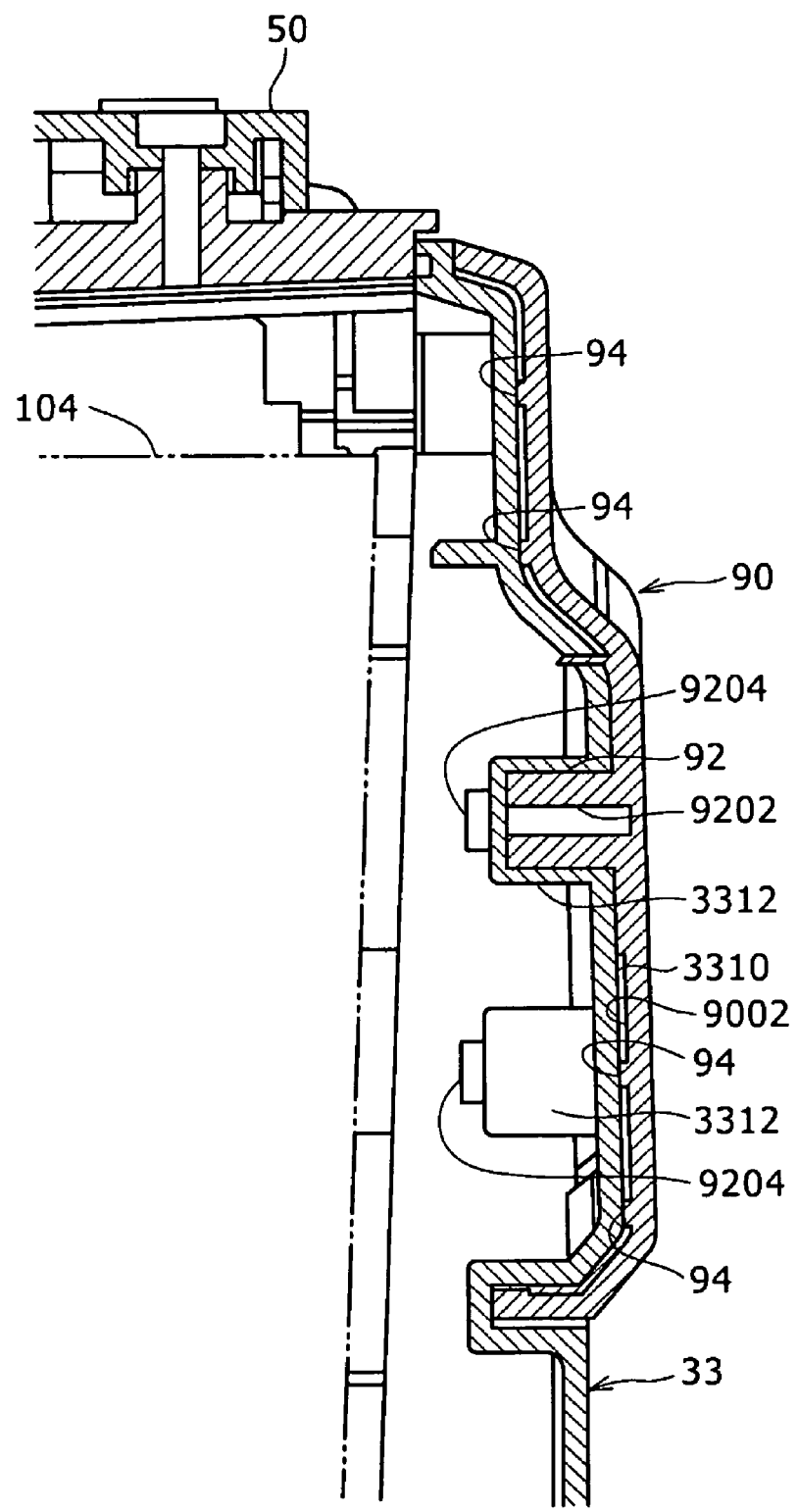
FIG. 1 is a sectional view of a cheek pad.

FIG. 1 is a sectional view of the cheek pad 90.

Figure 2:
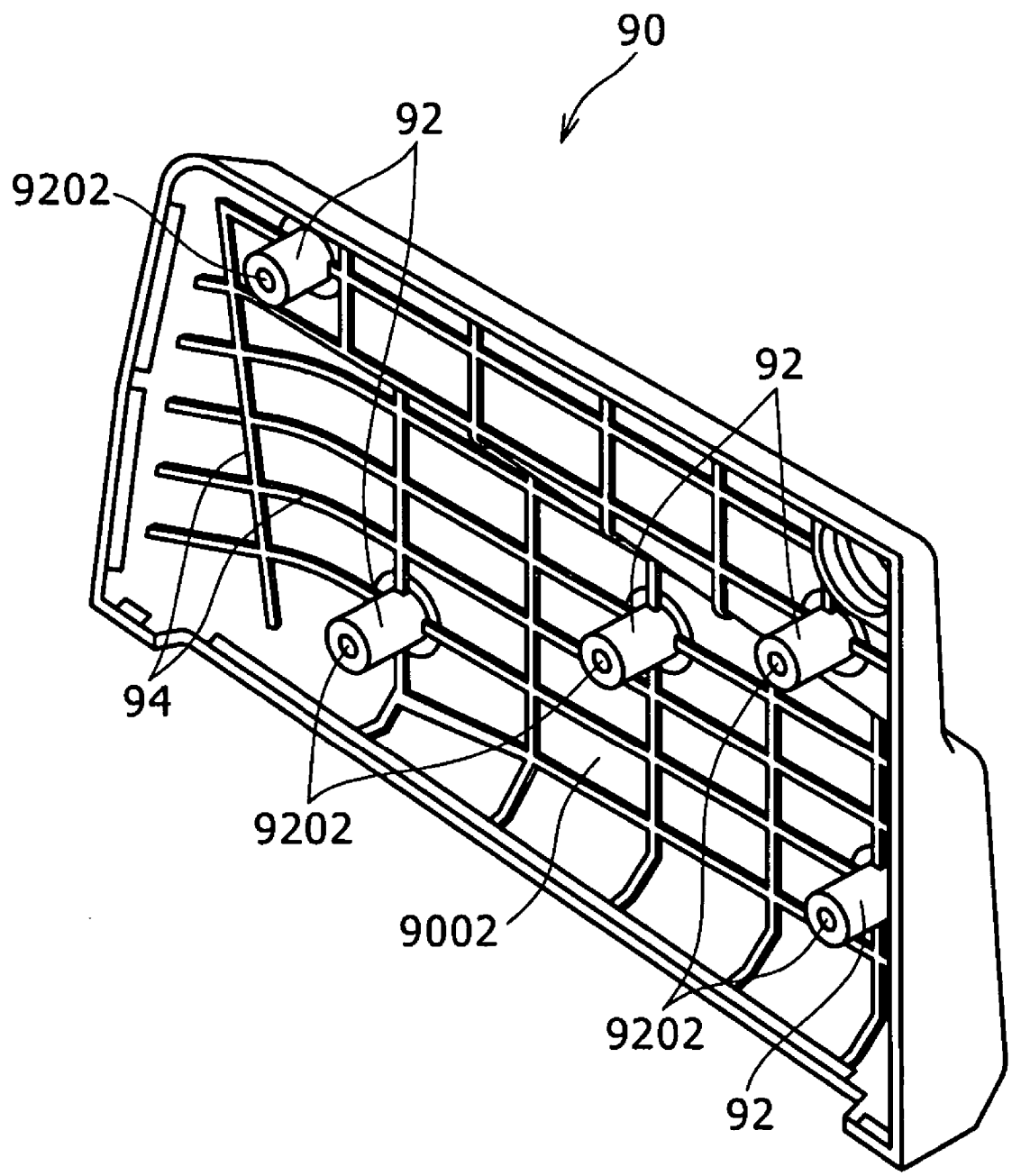
FIG. 2 is a perspective view of the cheek pad.
Figure 3A:
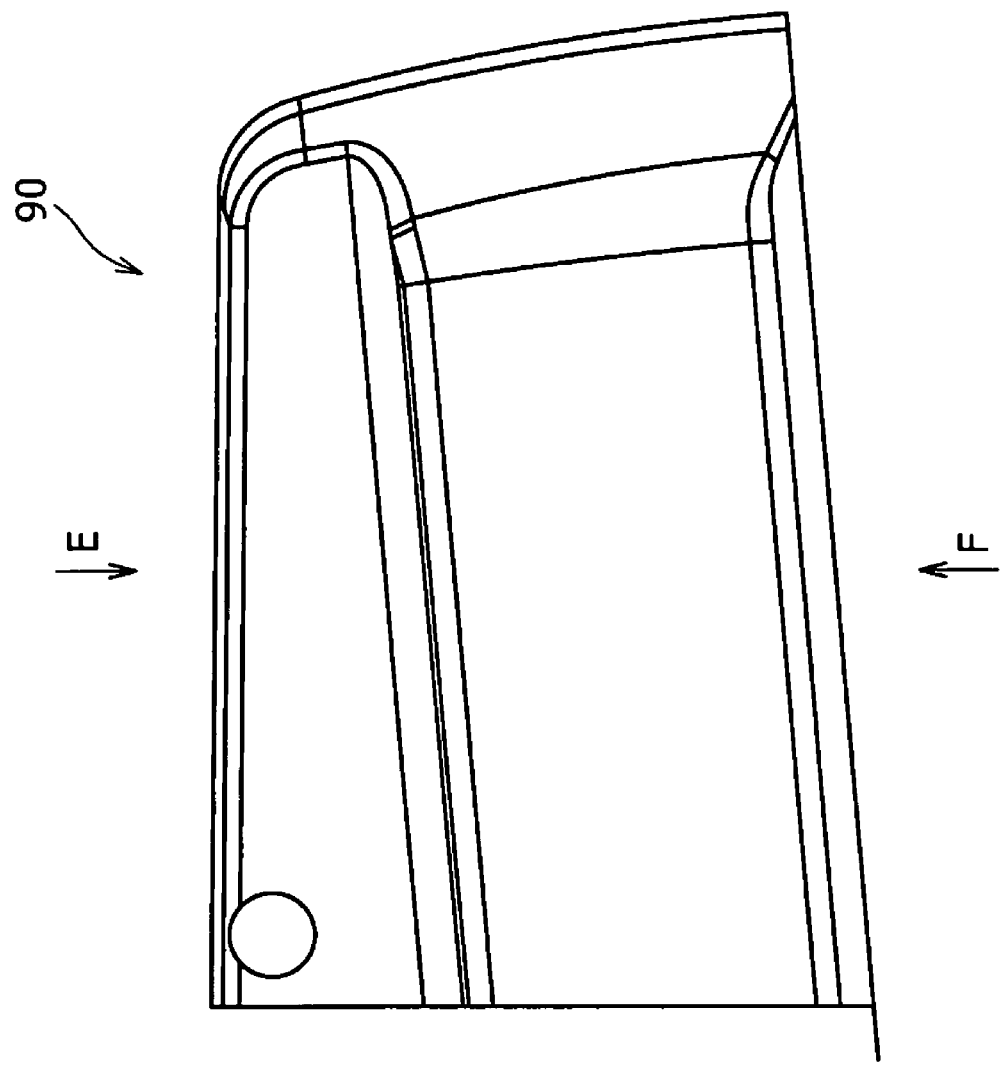
FIG. 3(A) is a plan view of the cheek pad.
Figure 3B:
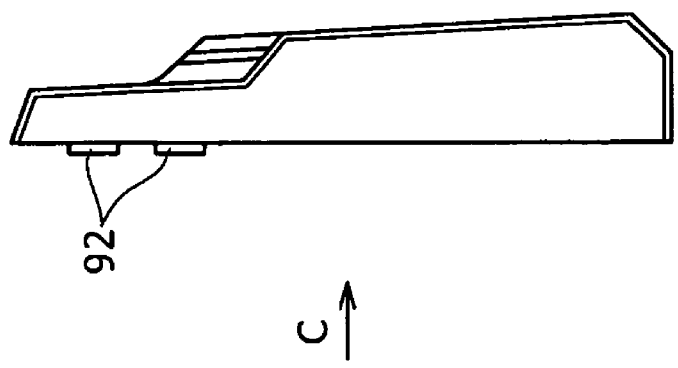
FIG. 3(B) is an end view of the cheek pad taken in the direction of the arrow B in FIG. 3(A)
Figure 4C:
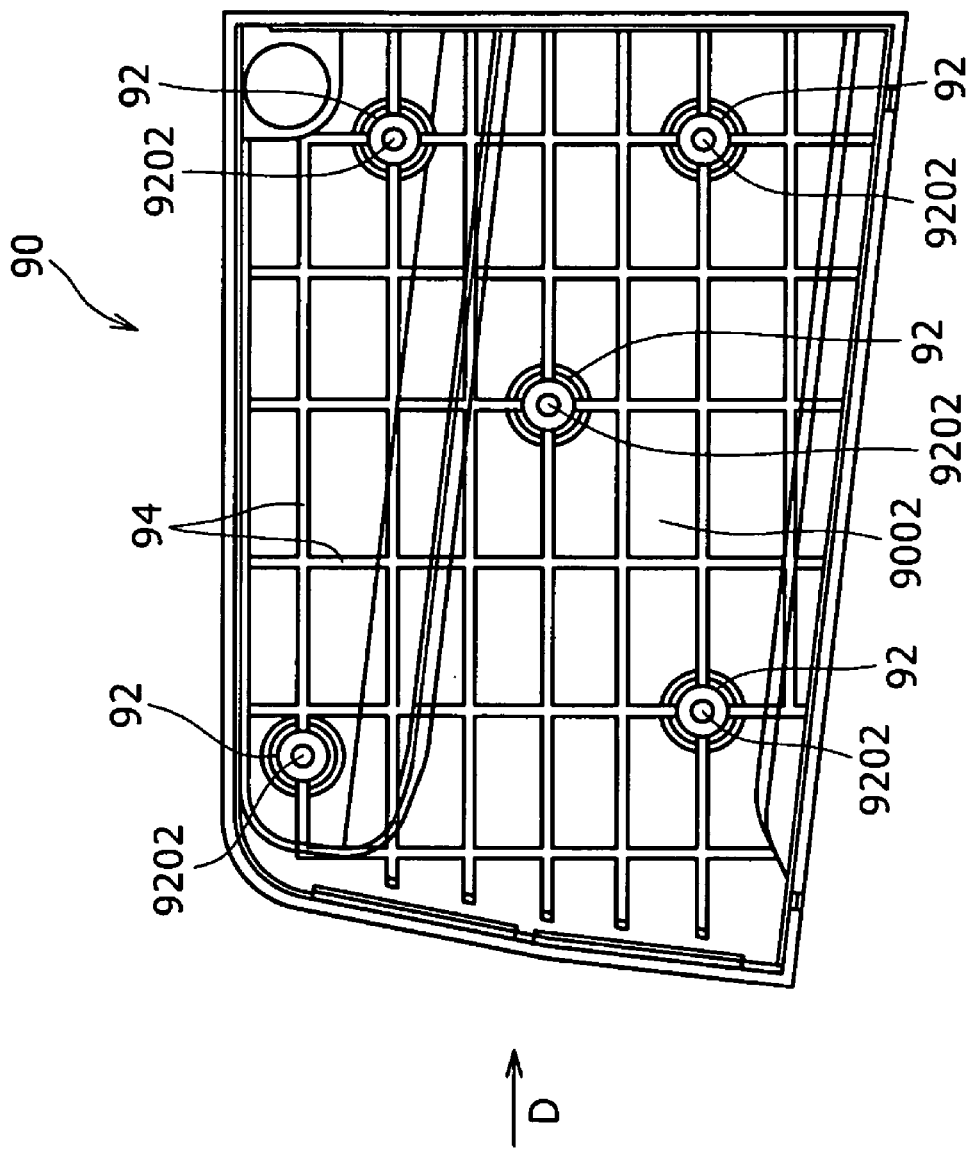
FIG. 4(C) is a plan view of the cheek pad taken in the direction of the arrow C in FIG. 3(B)
Figure 4D:
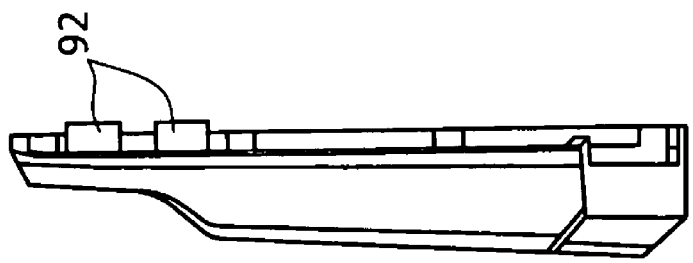
FIG. 4(D) is an end view of the cheek pad taken in the direction of the arrow D in FIG. 4(C)
Figure 5E:
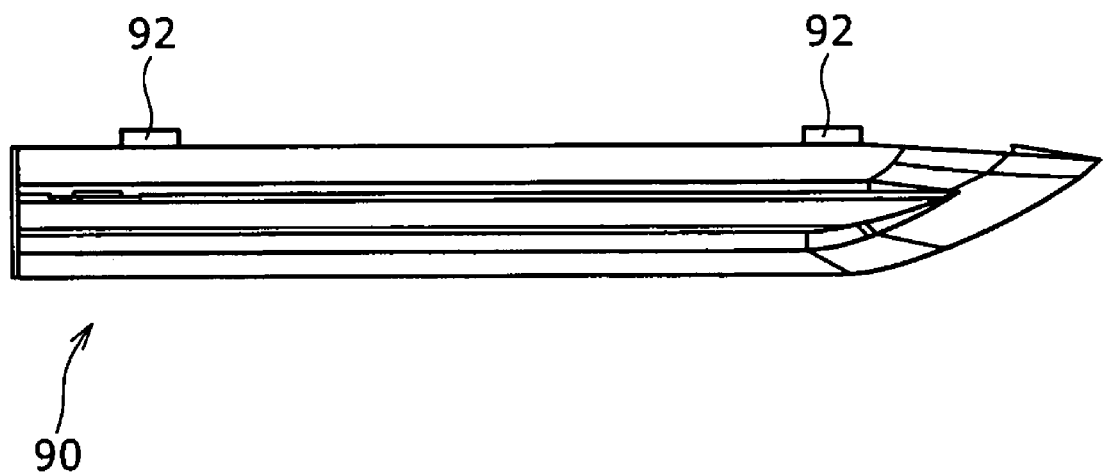
FIG. 5(E) is a side elevation of the cheek pad taken in the direction of the arrow E in FIG. 3(A)
Figure 5F:
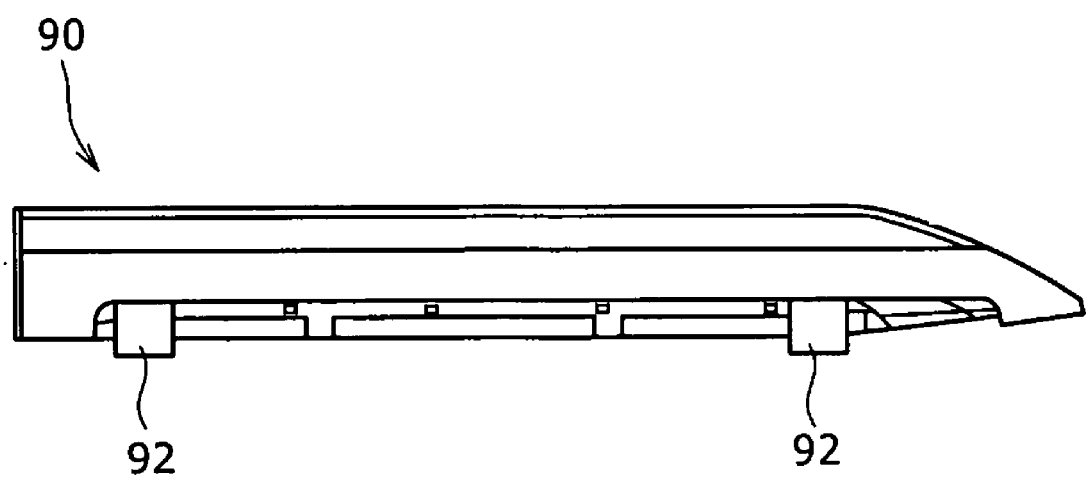
FIG. 5(F) is a side elevation of the cheek pad taken in the direction of the arrow F in FIG. 3(A)

FIG. 2 is a perspective view of the cheek pad 90, FIG. 3(A) is a plan view of the cheek pad 90, FIG. 3(B) is an end view of the cheek pad 90 taken in the direction of the arrow B in FIG. 3(A), FIG. 4(C) is a plan view of the cheek pad 90 taken in the direction of the arrow C in FIG. 3(B), FIG. 4(D) is an end view of the cheek pad taken in the direction of the arrow D in FIG. 4(C), FIG. 5(E) is a side elevation of the cheek pad taken in the direction of the arrow E in FIG. 3(A), FIG. 5(F) is a side elevation of the cheek pad taken in the direction of the arrow F in FIG. 3(A).

Figure 6:
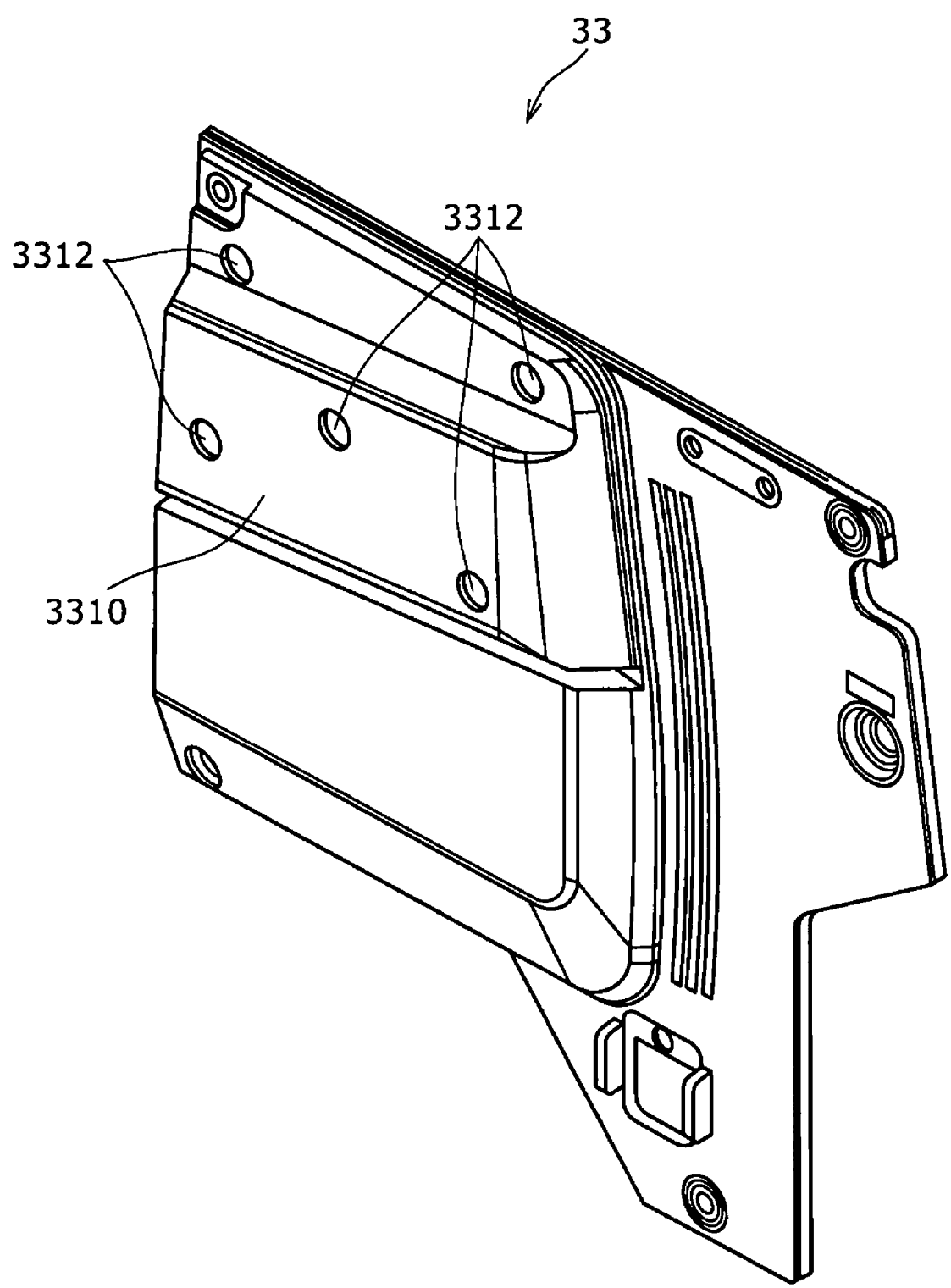
FIG. 6 is a perspective view of a covering member to which the cheek pad is attached.
Figure 7B:
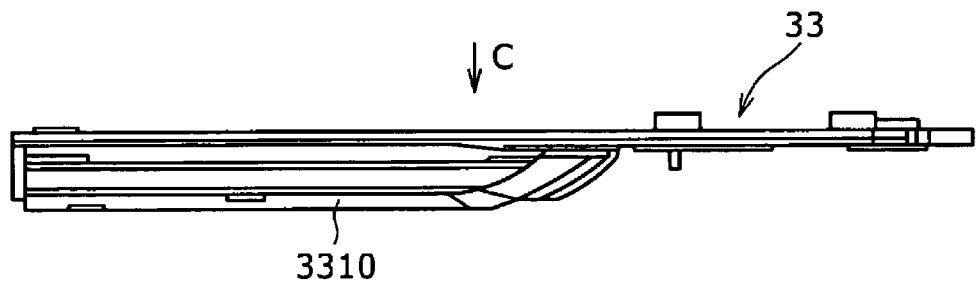
FIG. 7(B) is a side elevation of the covering member taken in the direction of the arrow B in FIG. 7(A)
Figure 7A:
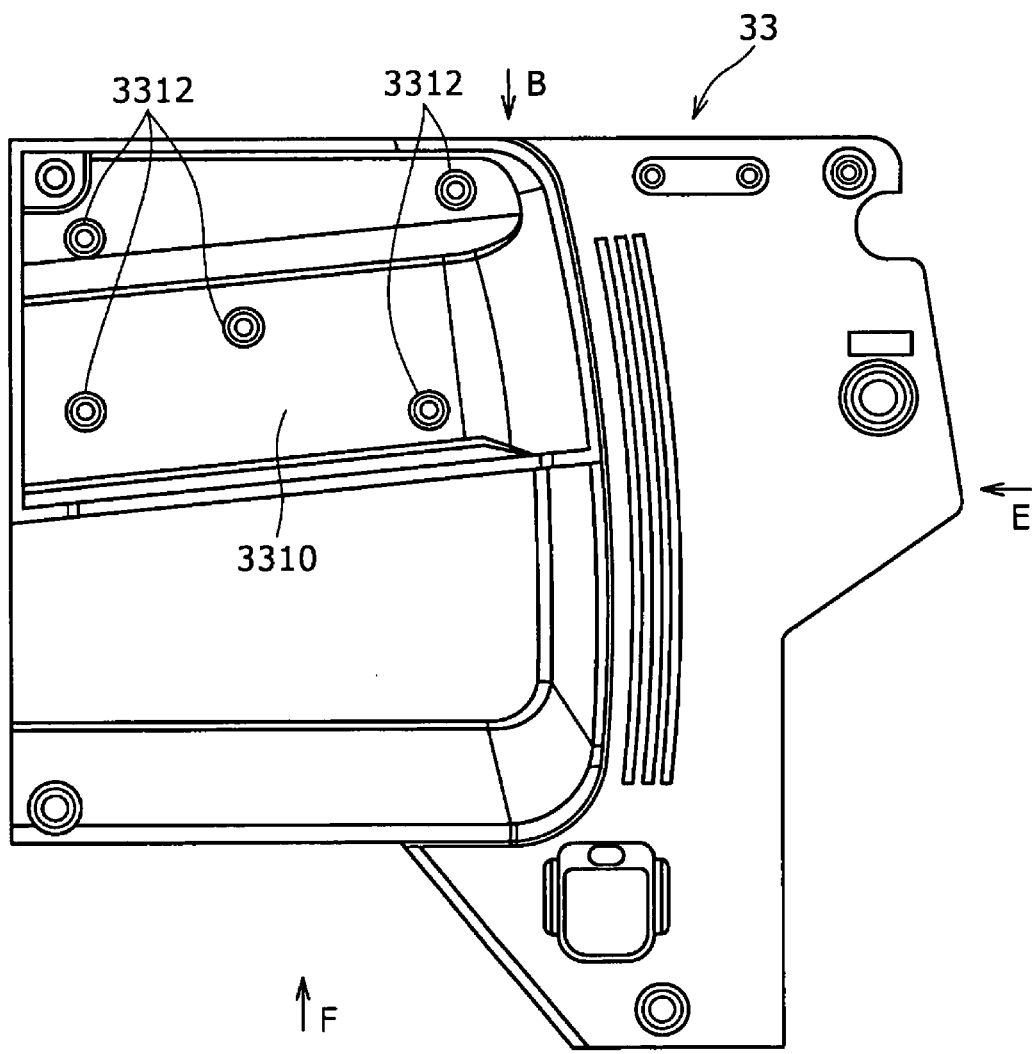
FIG. 7(A) is a plan view of the covering member.
Figure 9E:
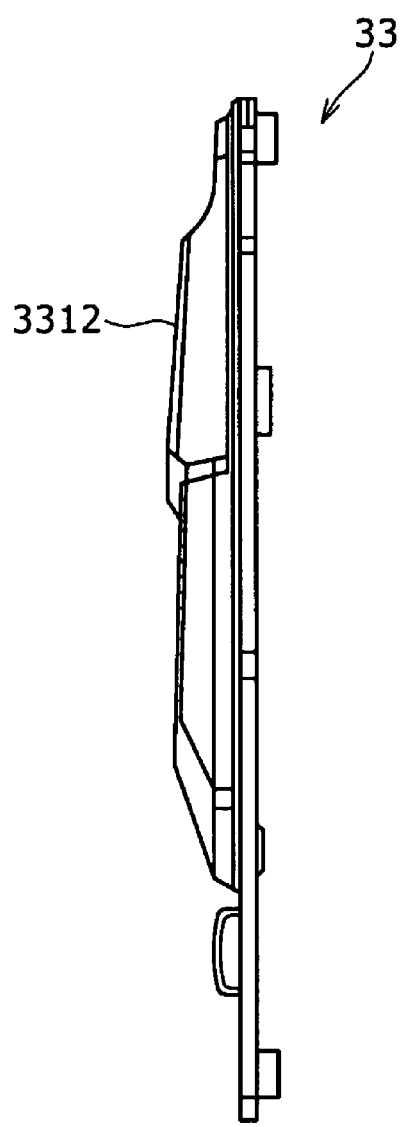
FIG. 9(E) is a side elevation of the covering member taken in the direction of the arrow E in FIG. 7(A)
Figure 9F:
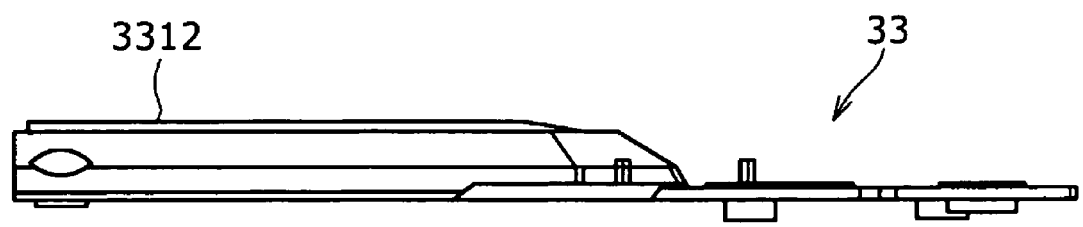
FIG. 9(F) is a side elevation of the covering member taken in the direction of the arrow F in FIG. 7(A)

FIG. 6 is a perspective view of a covering member 33 to which the cheek pad 90 is attached, FIG. 7(A) is a plan view of the covering member 33, FIG. 7(B) is a side elevation of the covering member 33 taken in the direction of the arrow B in FIG. 7(A), FIG. 8(C) is a plan view of the covering member 33 taken in the direction of the arrow C in FIG. 7(B), FIG. 8(D) is a side elevation of the covering member 33 taken in the direction of the arrow D in FIG. 8(C), FIG. 9(E) is a side elevation of the covering member 33 taken in the direction of the arrow E in FIG. 7(A) and FIG. 9(F) is a side elevation of the covering member 33 taken in the direction of the arrow F in FIG. 7(A).

Referring to FIG. 24, the covering members 33 are attached to the right and the left side of a frame 32. The covering members 33 cover the respective right and left sides of a front part 34, a back part 36 and a lower part 38.

In the fourth embodiment, the covering members 33 are side walls of a casing 30.

A shaded part in FIG. 21 is the cheek pad 90. The cheek pad 90 is attached to the left covering member 33 such that the cheek pad 90 corresponds to the user's cheek when a shoulder guard 31 is mounted on the user's shoulder.

The left covering member 33, namely, the left side wall of the casing 30, is made of a metal having a shock-resistant strength and a high thermal conductivity, such as aluminum or magnesium.

As shown in FIG. 1, the left covering member 33, namely, the left side wall, has a first wall part 3310 facing a heat-generating member held in the casing 30 and laterally spaced from the heat-generating members. As shown in FIG. 21, the first wall part 3310 is a substantially front half part of the covering member 33 (side wall).

In this embodiment, the heat generating member is a power supply 104.

The cheek pad 90 is made of an elastomer by injection molding.

As shown in FIG. 21, the cheek pad 90 covers the upper half part of the first wall part 3310 substantially entirely.

As shown in FIGS. 1 to 5, a plurality of bosses 92 project from the inner surface 9002, facing the substantially upper half part of the first wall part 3310, of the cheek pad 90. The bosses 92 are arranged at intervals and internally threaded plugs 9202 of a metal are embedded in the bosses 92, respectively.

As shown in FIGS. 1 and 6 to 9, the covering member 33 is provided in the first wall part 3310 with recesses 3312. The recesses 3312 correspond to the plurality bosses 92, respectively. The bosses 92 are engaged in the recesses 3312, respectively.

As shown in FIG. 1, screws 9204 are screwed through the bottom walls of the recesses 3312 in the internally threaded plugs 9202 to fasten the cheek pad 90 to the upper half part of the first wall part 3310.

As shown in FIGS. 1 and 2, the inner surface 9002, facing the upper half part of the first wall part 3310, of the cheek pad 90 is provided with a plurality of horizontal and vertical ribs 94. The ribs 94 are held in contact with the upper half part of the first wall part 3310 when the cheek pad 90 is attached to the upper half part of the first wall part 3310.

In the fourth embodiment, the left covering member 33 (the side wall) has the first wall part 3310 facing and laterally spaced apart from the heat-generating power supply 104, and the cheek pad 90 made of an elastomer is attached to the left covering member 33 so as to cover the upper half part of the covering member 33 substantially entirely.

Thus the first wall part 3310 is separated from the power supply 104 by a space. Transfer of heat from the power supply 104 to the first wall part 3310 and the cheek pad 90 can be effectively prevented by the space between the power supply 104 and the first wall part 3310. The cheek pad 90 is made of a single material, namely, the elastomer, and can be formed by using a single mold, which is advantageously reduces the cost.

A known cheek pad has a core made of a synthetic resin and a pad made of an elastomer and is formed by a two-color injection molding process. Thus the core and the pad are fused together. Therefore, when the pad is cleaned with alcohol or water, alcohol or water is likely to seep into the boundary between the core and the pad and, consequently, the pad is separated from the core.

The cheek pad 90 and the covering member 33 are separate members, and the cheek pad 90 can be surely attached to the covering member 33 by suitable known fastening means. Consequently, the cheek pad 90 will not come off the covering member 33 even if the cheek pad 90 is cleaned with alcohol or water. The cheek pad 90 is effective in improving the aesthetic appearance of the imaging operation controller.

Since the plurality of bosses 92 of the cheek pad 90 are fastened to the upper half part of the first wall part 3310 with the screws 9204, the cheek pad 90 is restrained from separating from the first wall part 3310 and any gaps will not be formed between the cheek pad 90 and the first wall part 3310, which is effective in improving the aesthetic appearance of the imaging operation controller.

The cheek pad 90 fastened to the first wall part 3310 with the screws 9204 can be easily changed.

The ribs 94 of the cheek pad 90 are held in contact with the upper half part of the first wall part 3310 when the cheek pad 90 is attached to the upper half part of the first wall part 3310. Thus the first wall part 3310 is separated from the power supply 104 by the space between the inner surface 9002 of the cheek pad 90 and the first wall part 3310. Therefore, transfer of heat from the power supply 104 to the first wall part 3310 and the cheek pad 90 can be effectively prevented.

The plurality of ribs 94 reinforces the cheek pad 90 and prevents the deformation of the cheek pad 90 when the cheek pad 90 is removed from the mold and cooled.

The elastomer injected into the mold to mold the cheek pad 90 generates gases. Irregularities are likely to be formed in the surface of the cheek pad 90 to spoil the aesthetic appearance of the cheek pad 90 if the gases generated by the elastomer stagnate between the mold and the elastomer injected into the mold.

In this embodiment, the gases are discharged from the mold through a hole formed at apart, facing the inner surface 9002 of the cheek pad 90, of the mold to receive an ejector pin or a degassing hole formed in a recess of the mold for forming the boss 92. Thus formation of irregularities in the surface of the cheek pad 90 and spoiling the aesthetic appearance of the cheek pad 90 by the irregularities can be avoided, which is effective in improving the aesthetic appearance of the imaging operation controller.

The imaging operation controller in the fourth embodiment will be described in comparison with a known imaging operation controller.

Figure 43:
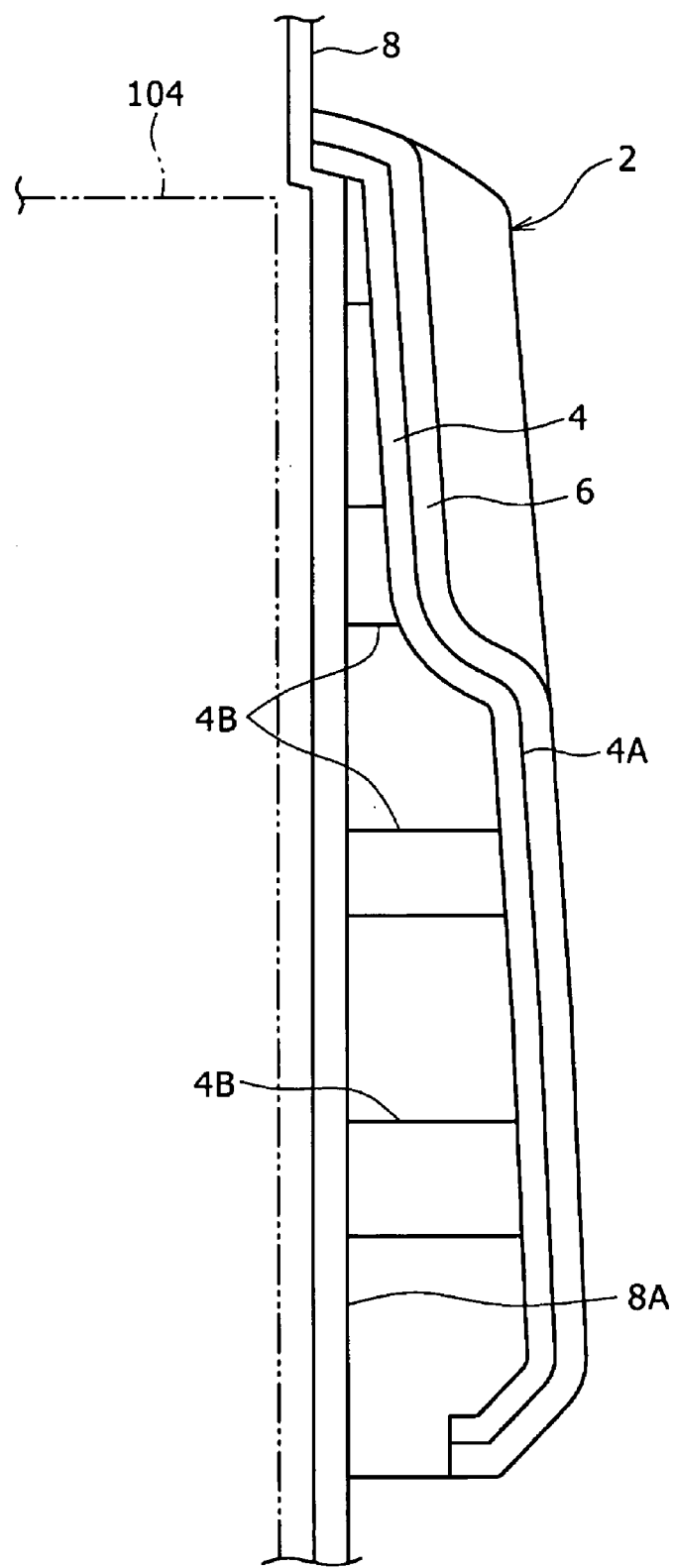
FIG. 43 is a sectional view of a known structure according to a fourth embodiment of the present invention.

FIG. 43 shows a known cheek pad 2 by way of example.

The cheek pad 2 has a core 4 made of a hard synthetic resin and a pad 6 made of an elastomer and covering the outer surface of the core 4. The core 4 and the pad 6 are formed integrally by a two-color injection molding process.

The two-color injection molding process forms the core 4 by using a two-part mold having an upper half mold on the outer side of the core 4 and a lower half mold on the inner side of the core 4.

Then, the upper half mold is changed for another upper half mold for forming the pad 6 and the pad 6 is molded over the outer surface of the core 4.

The core 4 has a wall 4A spaced laterally from a power supply 104, namely, a heat-generating device. The pad 6 covers the outer surface of the wall 4A.

A plurality of bosses 4B are formed on the inner surface of the core 4. The bosses 4B are fastened to the side wall 8A of a casing 8 with screws or are welded to the side wall 8A of the casing 8.

This known cheek pad 2 is formed by a two-color injection molding process using the hard synthetic resin for forming the core 4 and the elastomer for forming the pad 6. The hard synthetic resin and the elastomer increase the material cost of the cheek pad 2, and the two-color injection molding process using the plurality of molds increases manufacturing steps and the manufacturing cost of the cheek pad 2.

The cheek pad 90 of the imaging operation controller in the fourth embodiment does not have any part corresponding to the core 4. Thus the cheek pad 90 can be manufactured at a low material cost and a low manufacturing cost.

In the step of forming the pad 6 of the elastomer in the two-color injection molding process, gases generated by the elastomer cannot be allowed to escape in the direction of the thickness of the pad 6, because the core 4 is contiguous with the inner surface of the pad 6 of the elastomer and gas vents cannot be formed in the upper half mold for forming the pad 6 having the outer surface that needs to have an aesthetically good appearance.

Consequently, gases are caught between the pad 6 of the elastomer and the molding surface of the upper half mold and thereby irregularities that spoil the appearance of the cheek pad 2 are likely to be formed in the outer surface of the pad 6.

In molding the elastomer to form the cheek pad 90 of the imaging operation controller in the fourth embodiment, gases are allowed to escape through the inner side of the inner surface of the cheek pad 90. Thus any irregularities will not be formed in the outer surface of the cheek pad 90 of the elastomer that is required to have an aesthetically satisfactory appearance.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An imaging operation controller detachably connectable to a camera unit for taking an image of an object and providing image signals representing the image, and capable of converting the image signals received from the camera unit into corresponding video signals and of sending the video signals to an external device, said imaging operation controller comprising:

a casing; and a control panel attached to the casing and provided with a plurality of operating members and function indicators indicating the functions of the operating members and placed near the operating members, respectively;

wherein the control panel includes a base plate attached to the casing, a mounting plate placed on the base plate and a printed indicator sheet placed on the mounting plate, the plurality of operating members are supported on the base plate, indicator lighting light sources are supported on the base plate at positions respectively corresponding to the function indicators, the mounting plate is provided with openings in which the plurality of operating members are inserted, respectively, and windows at positions respectively corresponding to the indicator lighting light sources, the printed indicator sheet is provided with openings in which the plurality of operating members are inserted, respectively, and the function indicators are disposed on the printed indicator sheet so as to correspond to the plurality of windows, respectively, wherein the control panel is attached to the casing so as to face backward, the plurality of indicator lighting light sources are disposed so as to emit light backward, illuminating light sources for illuminating a nearby space are placed on the base plate so as to emit light downward, the mounting plate has a first flat part superposed on the base plate and provided with the openings in which the plurality of operating members are inserted and the windows corresponding to the indicator lighting light sources, and a second flat part extending at an angle to the first flat part from the lower end of the first flat part, and the second flat part is provided with an illumination window through which light emitted by the light sources travels downward.

2. The imaging operation controller according to claim 1, wherein a diffuser for diffusing light is fitted in the illumination window.

3. The imaging operation controller according to claim 1 further including a switching means for switching on and off the plurality of indicator lighting light sources.

4. The imaging operation controller according to claim 1 further comprising a switching means for switching on and off the illuminating light sources.

5. The imaging operation controller according to claim 1 further comprising a switching means for switching on and off the indicator lighting light sources and the illuminating light sources, wherein the switching means can be selectively set to one of a first position for switching on both the indicator lighting light sources and the illuminating light sources, a second position for switching on the indicator lighting light sources or the illuminating light sources and a third position for making both the indicator lighting light sources and the illuminating light sources flicker.

6. The imaging operation controller according to claim 1 further comprising guard bars attached to parts of the casing near the control panel to protect the operating members, touch sensing means placed on the guard bars to detect objects that touch the guard bars, and a controller for switching on the indicator lighting light sources upon the reception of a detection signal provided by the touch sensing means when an object comes into contact with the guard bar.

7. The imaging operation controller according to claim 1 further comprising guard bars attached to parts of the casing near the control panel to protect the operating members, touch sensing means placed on the guard bars to detect objects that touch the guard bars, and a control means for switching on the indicator lighting light sources upon the reception of a detection signal provided by the touch sensing means when an object comes into contact with the touch sensing means; wherein the control means switches off the indicator lighting light sources after keeping the indicator lighting light sources turned on for a predetermined time.

8. The imaging operation controller according to claim 1 further comprising an illuminance measuring means for measuring illuminance of a space around the imaging operation controller, and a control means for switching on the indicator lighting light sources when an illuminance measured by the illuminance measuring means is below a predetermined threshold illuminance.

9. The imaging operation controller according to claim 1 further comprising a luminous intensity adjusting means for adjusting luminous intensity of the indicator lighting light sources.

10. The imaging operation controller according to claim 1 further comprising a luminous intensity adjusting means for adjusting luminous intensity of the illuminating light sources.

* * * * *